US012615355B2

(12) United States Patent
Kimura

(10) Patent No.: US 12,615,355 B2
(45) Date of Patent: Apr. 28, 2026

(54) INFORMATION PROCESSING APPARATUS, INFORMATION PROCESSING METHOD, AND SYSTEM

(71) Applicant: Sony Group Corporation, Tokyo (JP)

(72) Inventor: Seiji Kimura, Chiba (JP)

(73) Assignee: SONY GROUP CORPORATION, Tokyo (JP)

( * ) Notice: Subject to any disclaimer, the term of this patent is extended or adjusted under 35 U.S.C. 154(b) by 100 days.

(21) Appl. No.: 18/283,168

(22) PCT Filed: Jan. 13, 2022

(86) PCT No.: PCT/JP2022/000899
§ 371 (c)(1),
(2) Date: Sep. 20, 2023

(87) PCT Pub. No.: WO2022/209130
PCT Pub. Date: Oct. 6, 2022

(65) Prior Publication Data
US 2024/0163414 A1 May 16, 2024

(30) Foreign Application Priority Data
Mar. 31, 2021 (JP) ................................. 2021-061476

(51) Int. Cl.
*H04N 13/243* (2018.01)
*H04N 13/144* (2018.01)
*H04N 13/275* (2018.01)
(52) U.S. Cl.
CPC ......... *H04N 13/243* (2018.05); *H04N 13/144* (2018.05); *H04N 13/275* (2018.05)

(58) Field of Classification Search
None
See application file for complete search history.

(56) References Cited

U.S. PATENT DOCUMENTS

| 10,796,489 B1 | 10/2020 | Cordes |
| 2006/0146005 A1 | 7/2006 | Baba |

(Continued)

FOREIGN PATENT DOCUMENTS

| JP | 2004-129003 A | 4/2004 |
| JP | 2006078597 A | 3/2006 |

(Continued)

*Primary Examiner* — Christopher Braniff
(74) *Attorney, Agent, or Firm* — Paratus Law Group, PLLC

(57) ABSTRACT

There is provided an information processing apparatus, an information processing method, and a system that can give a more highly entertaining experience by pursuing both image-capturing of a subject and displaying of images around the subject. The information processing apparatus includes a control section that performs control of image-capturing with multiple image-capturing sections for acquiring three-dimensional information regarding a subject and display control to display an image acquired from an outside in one or more display regions positioned around the subject, in which the control section performs control such that a timing when the image-capturing is performed and a timing when the image acquired from the outside is displayed in the display regions are made different from each other.

13 Claims, 20 Drawing Sheets

(56)      References Cited

U.S. PATENT DOCUMENTS

| 2008/0084508 | A1 | | 4/2008 | Cole |
| 2010/0066816 | A1 | * | 3/2010 | Kane .................... H04N 13/341 |
| | | | | 348/E13.001 |
| 2015/0222880 | A1 | | 8/2015 | Choi et al. |
| 2015/0348326 | A1 | | 12/2015 | Sanders |

FOREIGN PATENT DOCUMENTS

| JP | 2009-187387 | A | | 8/2009 |
| JP | 2009239762 | A | | 10/2009 |
| JP | 6307426 | B2 | * | 4/2018 |
| JP | 2018-075259 | A | | 5/2018 |
| WO | WO-2013006170 | A1 | | 1/2013 |
| WO | WO 2019/107180 | A1 | | 6/2019 |
| WO | WO 2020/044874 | A1 | | 3/2020 |

* cited by examiner

F I G . 1
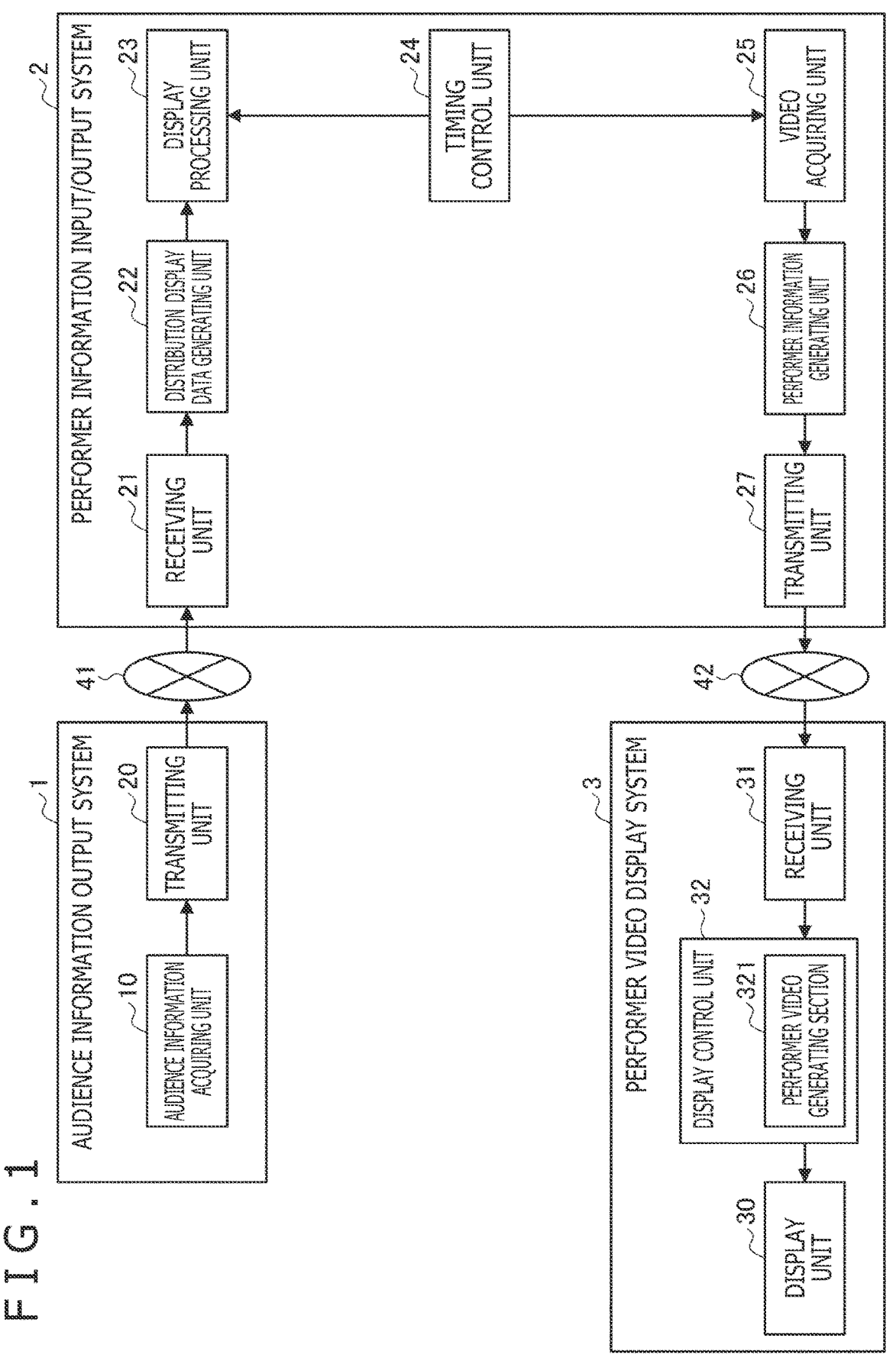

F I G . 4
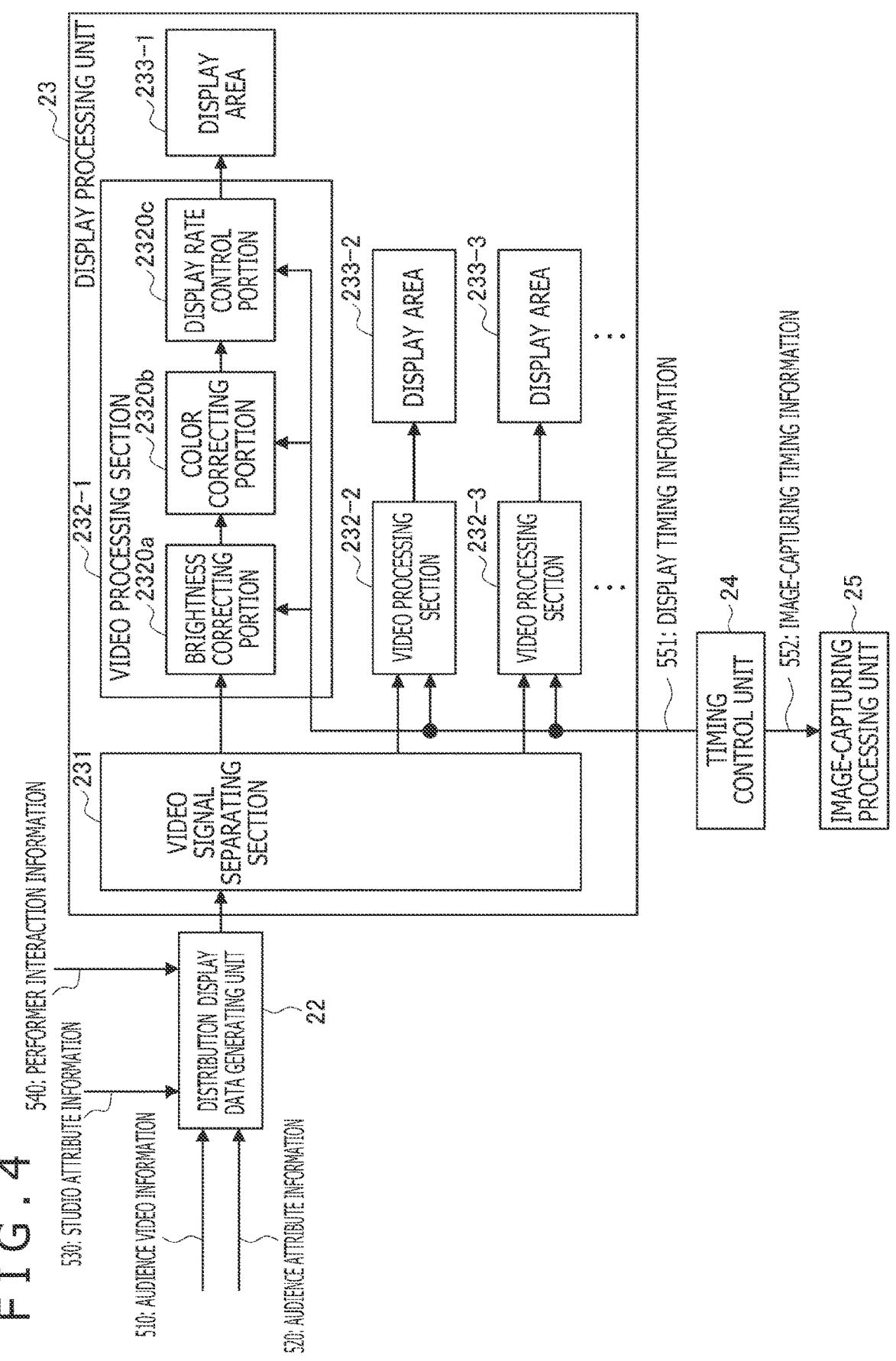

FIG.5
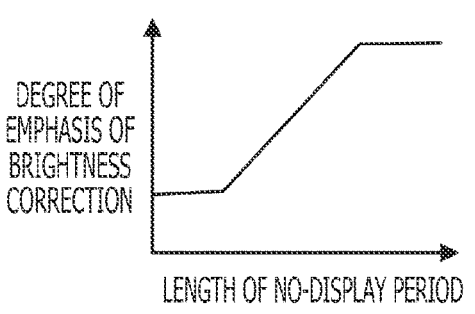
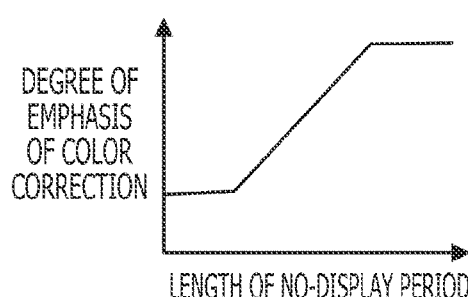
FIG.6
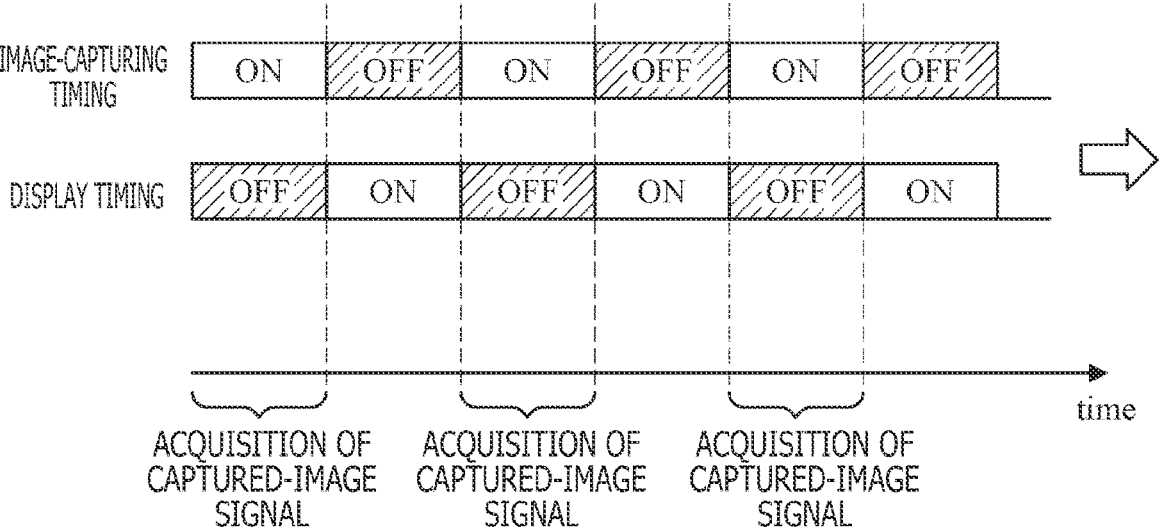

F I G . 7
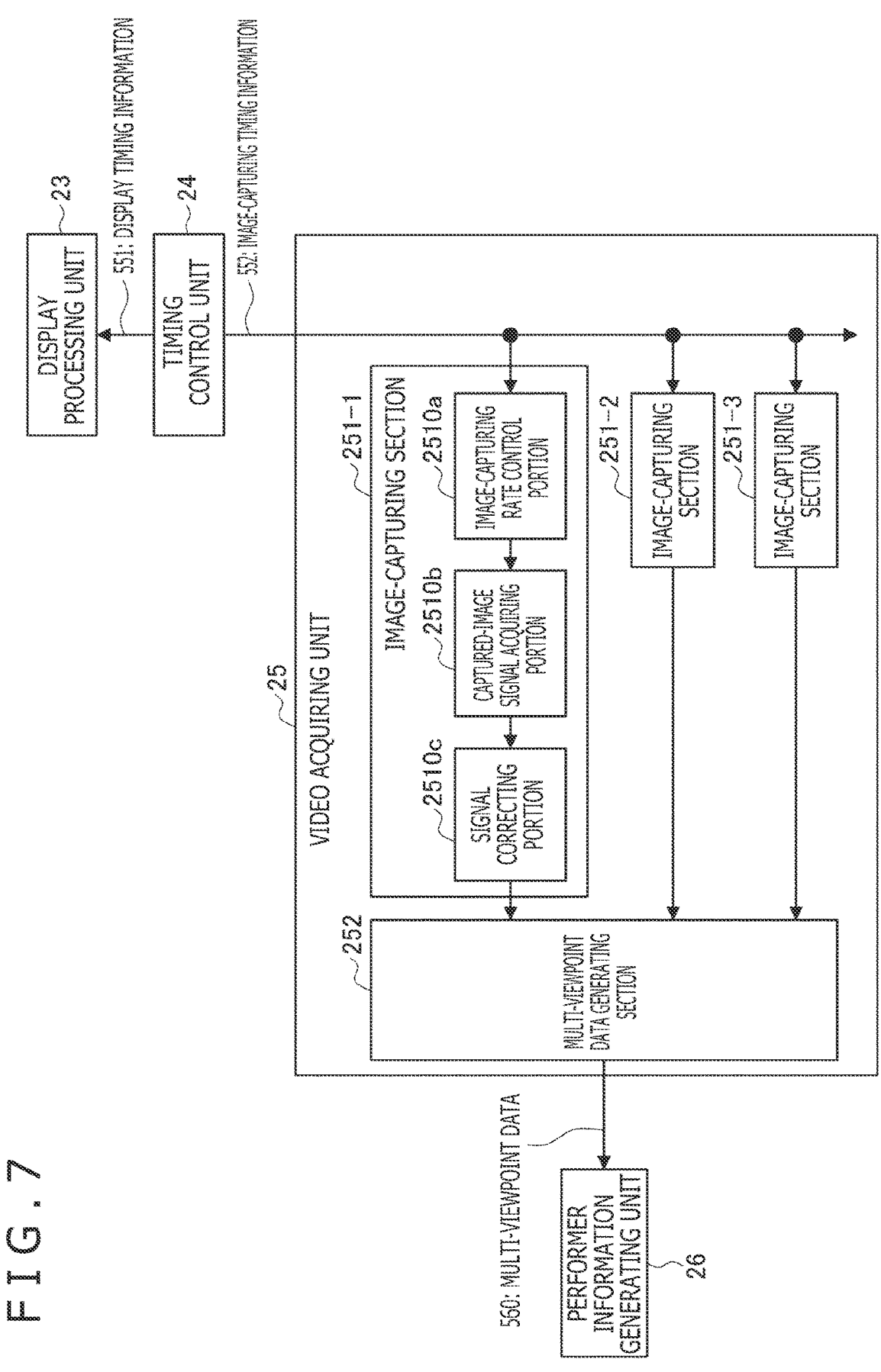

F I G . 8
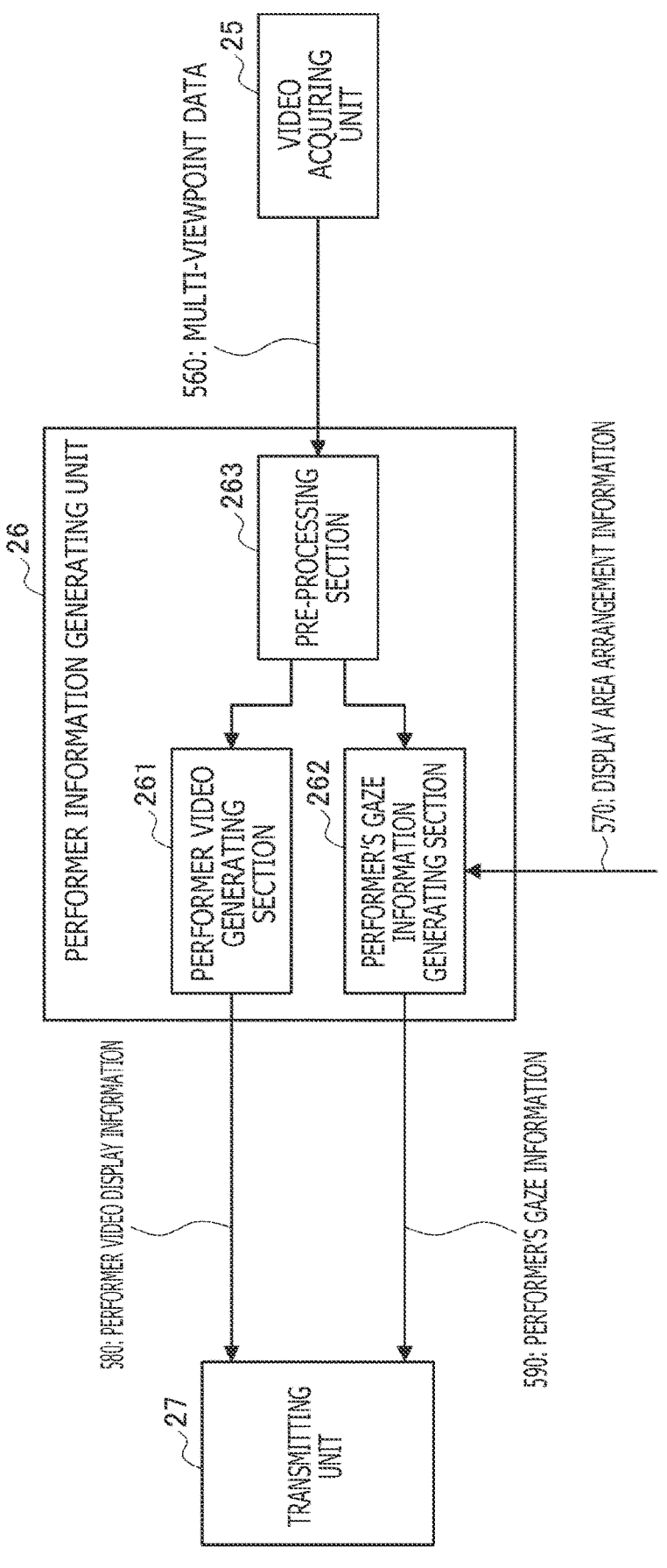

F I G . 9
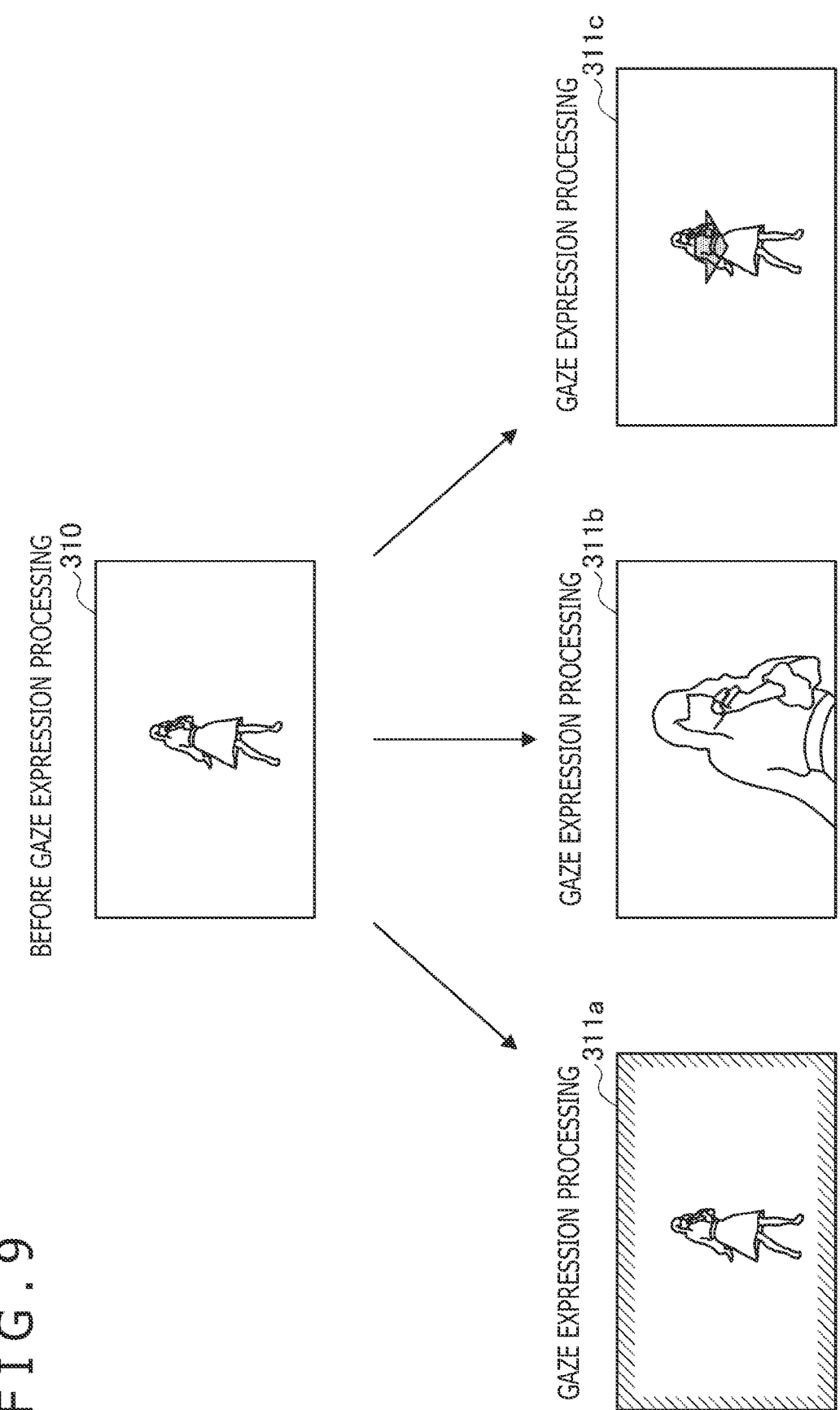

FIG. 10

PERFORMER SIDE (STUDIO)

AUDIENCE SIDE (CONCERT VENUE)

F I G . 1 1
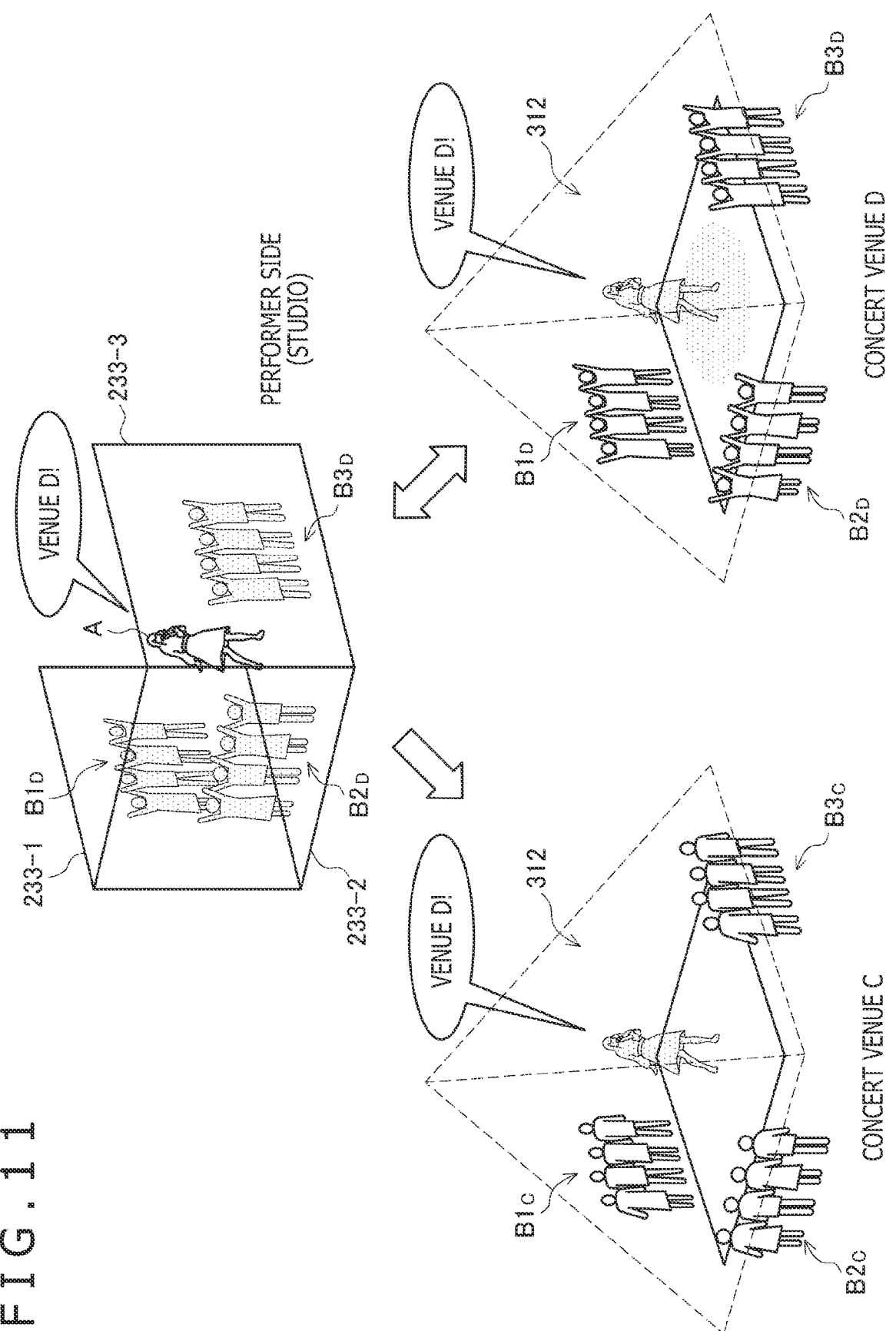

F I G . 1 2
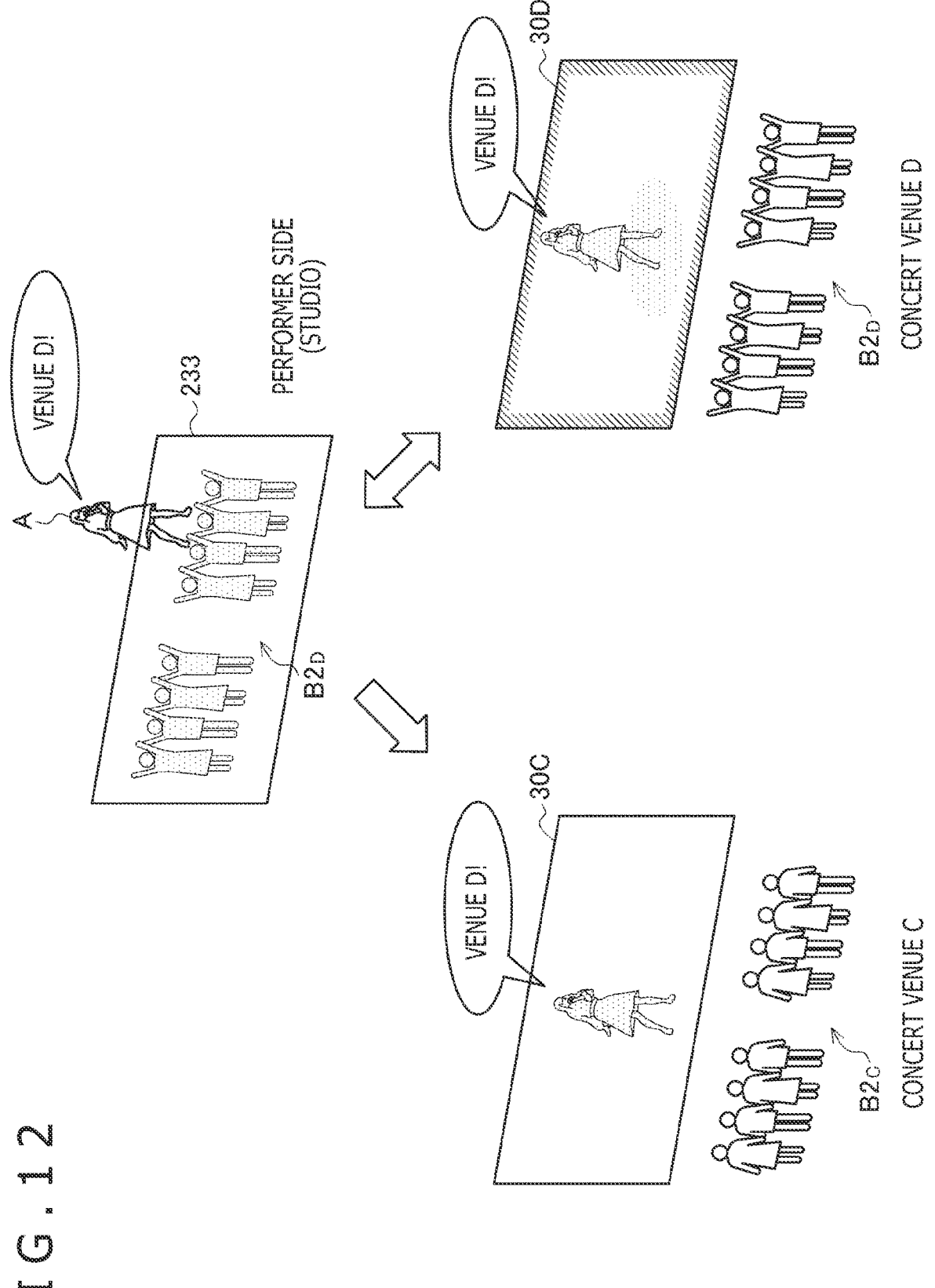

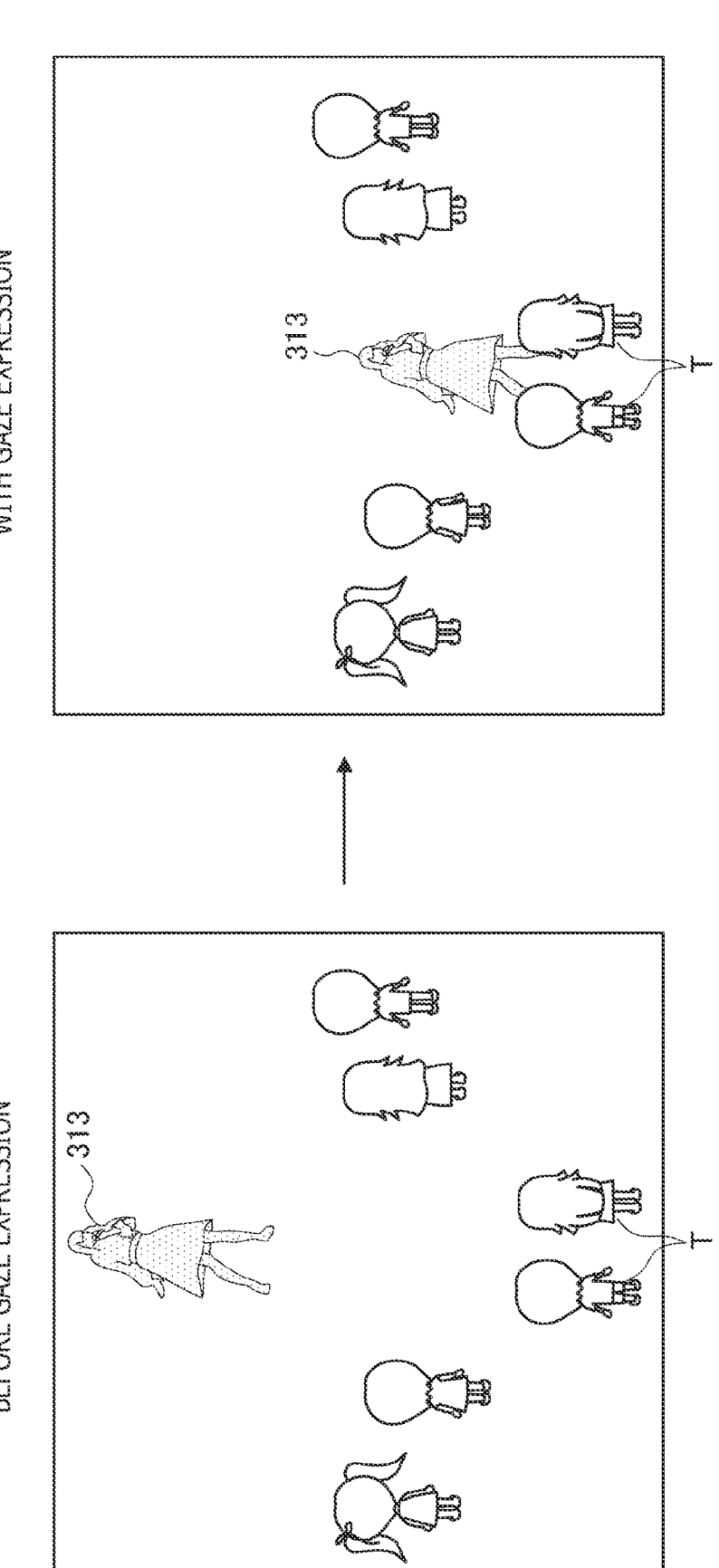
F I G . 1 3

F I G . 1 4

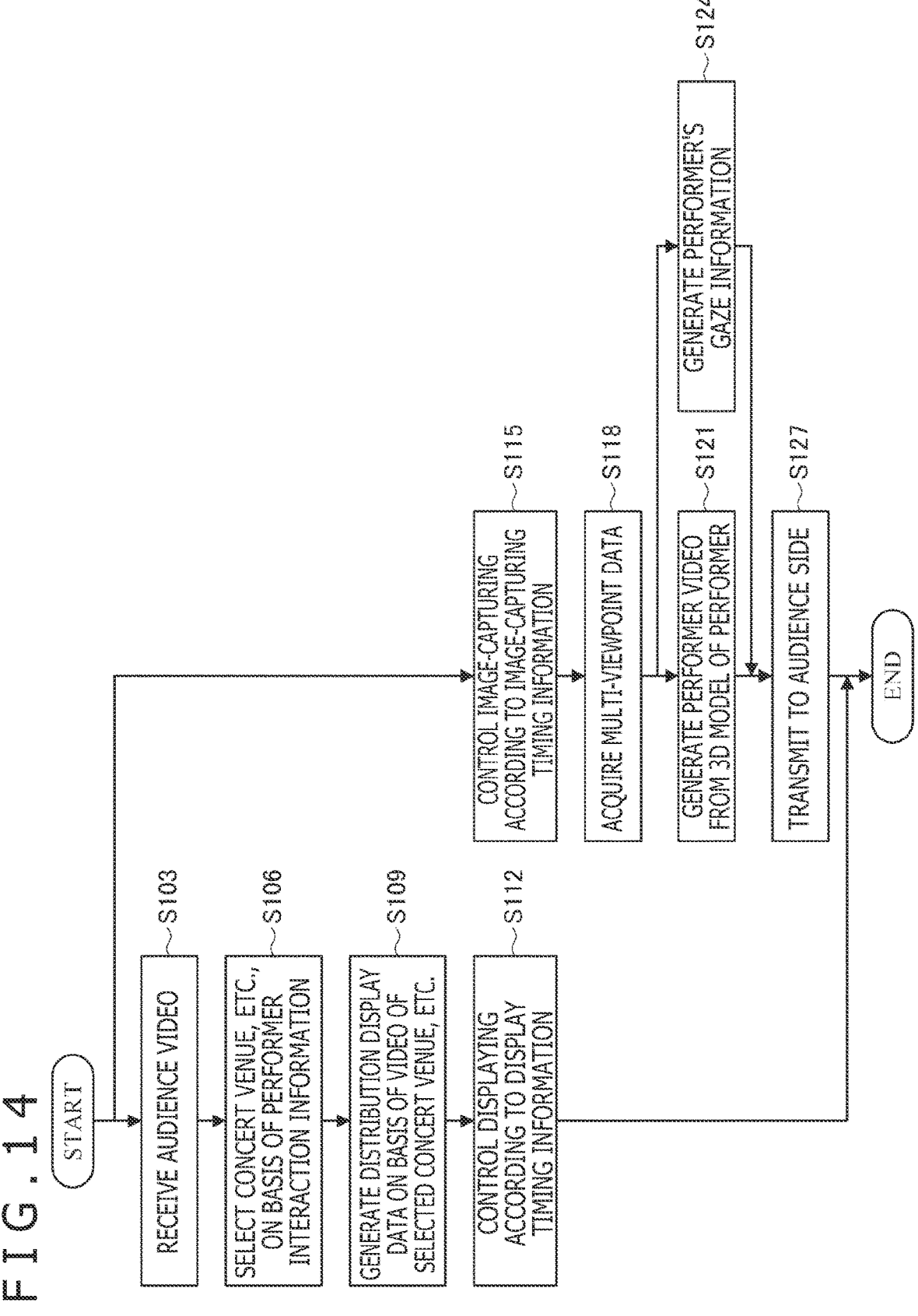

START

RECEIVE AUDIENCE VIDEO  ~S103

SELECT CONCERT VENUE, ETC., ON BASIS OF PERFORMER INTERACTION INFORMATION  ~S106

GENERATE DISTRIBUTION DISPLAY DATA ON BASIS OF VIDEO OF SELECTED CONCERT VENUE, ETC.  ~S109

CONTROL DISPLAYING ACCORDING TO DISPLAY TIMING INFORMATION  ~S112

CONTROL IMAGE-CAPTURING ACCORDING TO IMAGE-CAPTURING TIMING INFORMATION  ~S115

ACQUIRE MULTI-VIEWPOINT DATA  ~S118

GENERATE PERFORMER VIDEO FROM 3D MODEL OF PERFORMER  ~S121

GENERATE PERFORMER'S GAZE INFORMATION  ~S124

TRANSMIT TO AUDIENCE SIDE  ~S127

END

F I G . 1 5
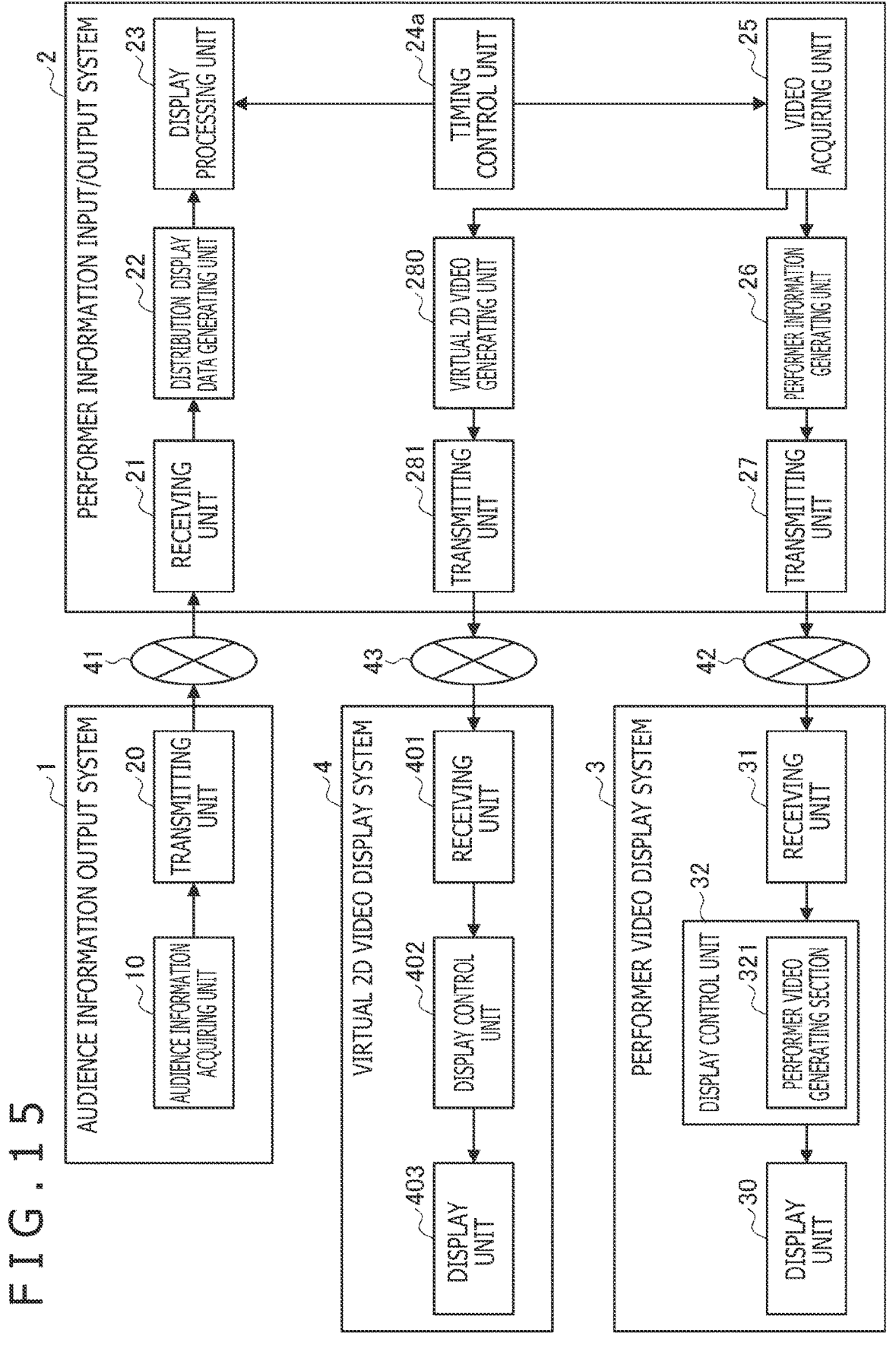

FIG. 16

CONCERT VENUE

F I G . 1 8
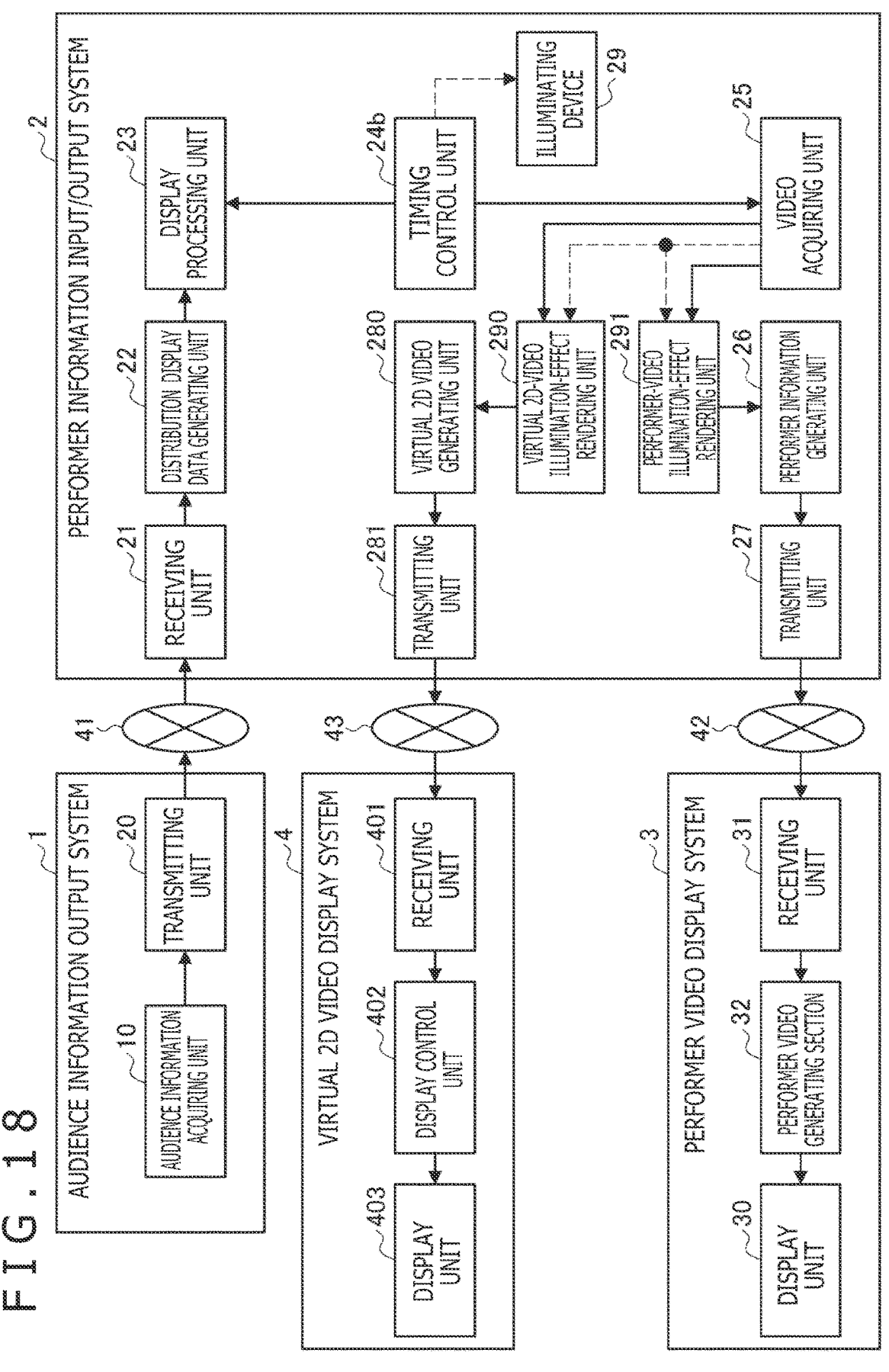

F I G . 1 9
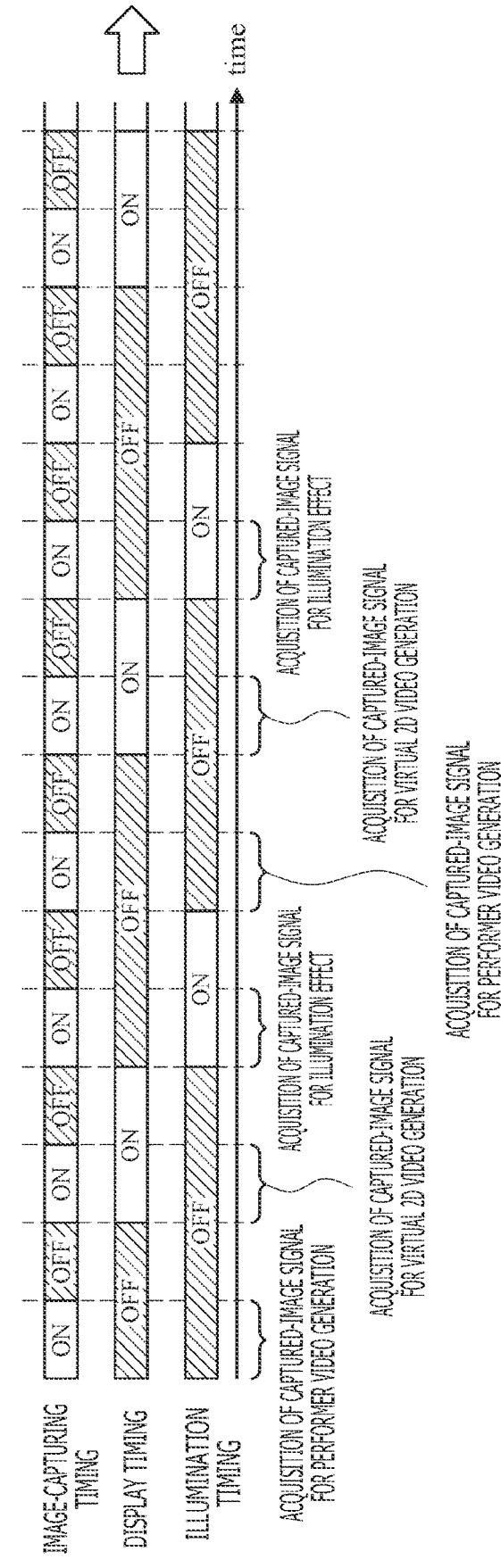

FIG. 20

F I G . 2 1
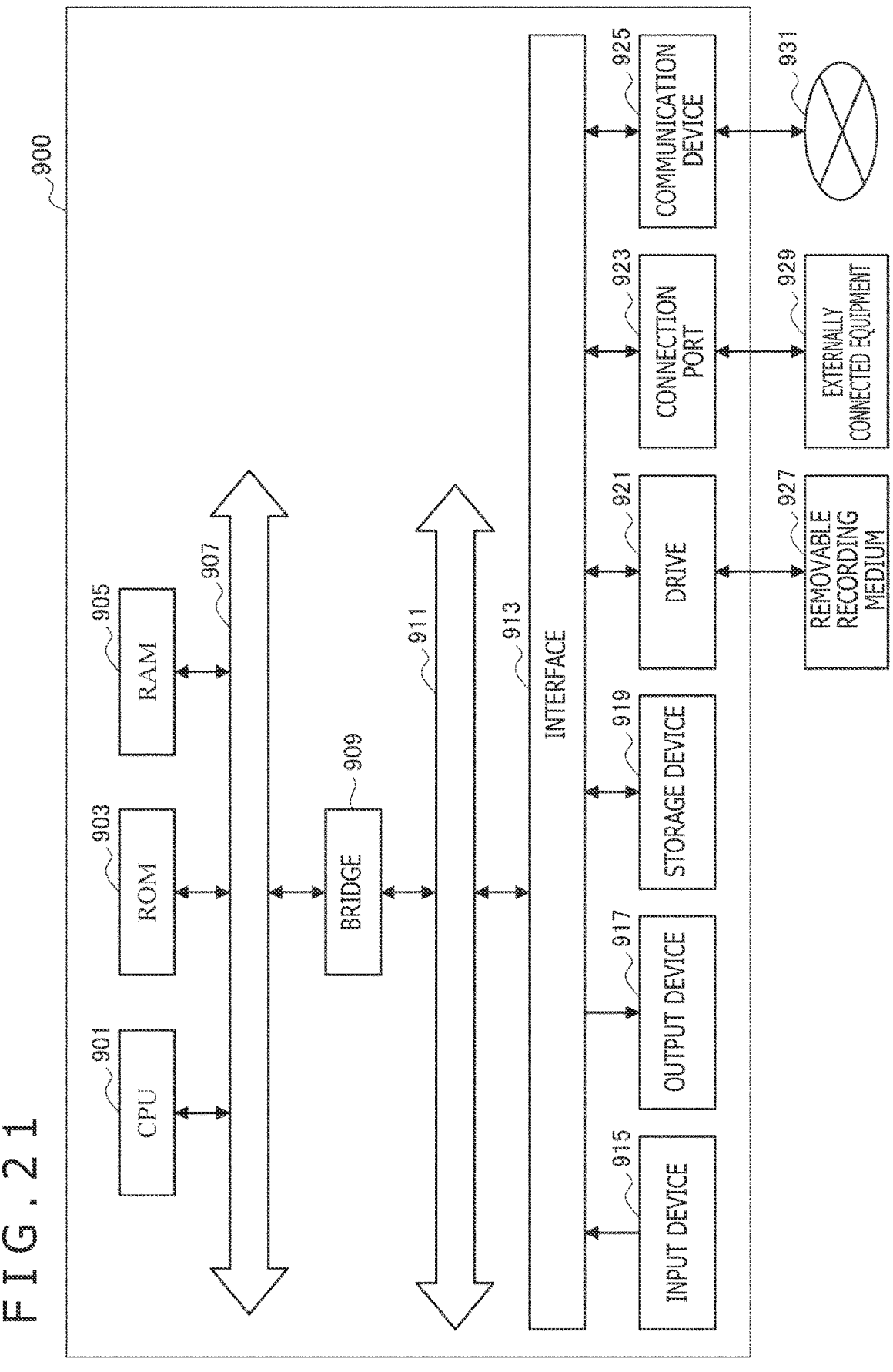

INFORMATION PROCESSING APPARATUS, INFORMATION PROCESSING METHOD, AND SYSTEM

CROSS REFERENCE TO PRIOR APPLICATION

This application is a National Stage Patent Application of PCT International Patent Application No. PCT/JP2022/000899 (filed on Jan. 13, 2022) under 35 U.S.C. § 371, which claims priority to Japanese Patent Application No. 2021-061476 (filed on Mar. 31, 2021), which are all hereby incorporated by reference in their entirety.

TECHNICAL FIELD

The present disclosure relates to an information processing apparatus, an information processing method, and a system.

BACKGROUND ART

Conventionally, green screens or blue screens have been used to make it easier to extract regions of persons (silhouette images of subjects) from captured images. As to extraction of a region of a subject from a captured image, for example, PTL 1 described below discloses a technology for generating a three-dimensional model of the subject by using N RGB images that are acquired from N RGB cameras provided at positions surrounding the subject, and M pieces of active depth information that are acquired from M active sensors similarly provided at positions surrounding the subject and that represent distances to the subject.

CITATION LIST

Patent Literature

[PTL 1]
PCT Patent Publication No. WO2019/107180

SUMMARY

Technical Problem

However, while the use of green screens or the like can make it easier to extract regions of a subject, it has been difficult to present images other than the green screens or the like to around the subject.

In view of this, the present disclosure proposes an information processing apparatus, an information processing method, and a system that can give a more highly entertaining experience by pursuing both image-capturing of a subject and displaying of images around the subject.

Solution to Problem

The present disclosure proposes an information processing apparatus including a control section that performs control of image-capturing with multiple image-capturing sections for acquiring three-dimensional information regarding a subject and display control to display an image acquired from an outside in one or more display regions positioned around the subject, in which the control section performs control such that a timing when the image-capturing is performed and a timing when the image acquired from the outside is displayed in the display regions are made different from each other.

The present disclosure proposes an information processing method performed by a processor, the information processing method including performing control of image-capturing with multiple image-capturing sections for acquiring three-dimensional information regarding a subject and display control to display an image acquired from an outside in one or more display regions positioned around the subject, and performing control such that a timing when the image-capturing is performed and a timing when the image acquired from the outside is displayed in the display regions are made different from each other.

The present disclosure proposes a system including multiple image-capturing devices that are arranged around a subject in order to acquire three-dimensional information regarding the subject, one or more display regions arranged around the subject, and an information processing apparatus including a control section that performs control of image-capturing with the multiple image-capturing devices and display control to display an image acquired from an outside in the one or more display regions, in which the control section performs control such that a timing when the image-capturing is performed and a timing when the image acquired from the outside is displayed in the display regions are made different from each other.

BRIEF DESCRIPTION OF DRAWINGS

FIG. 1 is a diagram for explaining an overview of information processing systems according to an embodiment of the present disclosure.

FIG. 4 is a block diagram mainly depicting a specific configuration example of a display processing unit of a performer information input/output system according to the present embodiment.

FIG. 5 is a diagram depicting the relation between the degree of emphasis of brightness/color correction and the length of a no-display period according to the present embodiment.

FIG. 6 is a diagram depicting an example of control of timings of display ON/OFF and image-capturing ON/OFF according to the present embodiment.

FIG. 7 is a block diagram mainly depicting a specific configuration example of a video acquiring unit of the performer information input/output system according to the present embodiment.

FIG. 8 is a block diagram mainly depicting a specific configuration example of a performer information generating unit of the performer information input/output system according to the present embodiment.

FIG. 9 is a diagram depicting an example of performer's gaze expression processing on a 2D performer video according to the present embodiment.

FIG. 10 is a diagram for explaining consistency between an audience-side concert venue and a performer-side studio according to the present embodiment.

FIG. 11 is a diagram for explaining a specific example of a performer's gaze expression in a case where a performer choses a particular concert venue according to the present embodiment.

FIG. 12 is a diagram for explaining another specific example of a performer's gaze expression in a case where the performer choses a particular concert venue according to the present embodiment.

FIG. 13 is a diagram for explaining an example of a performer's gaze expression in a case where the performer has specified particular audience avatars according to the present embodiment.

FIG. 14 is a flowchart depicting an example of a procedure of operation processes of displaying and image-capturing in the performer information input/output system according to the present embodiment.

FIG. 15 is a diagram depicting a configuration example of the information processing systems according to a first modification example of the present embodiment.

FIG. 16 is a diagram depicting an example of control of timings of display ON/OFF and image-capturing ON/OFF according to the first modification example of the present embodiment.

FIG. 18 is a diagram depicting a configuration example of the information processing systems according to a second modification example of the present embodiment.

FIG. 19 is a diagram depicting an example of control of timings of display ON/OFF, image-capturing ON/OFF, and illumination ON/OFF according to the second modification example of the present embodiment.

FIG. 20 is a diagram for explaining a virtual 2D-video illumination-effect rendering process and a performer-video illumination-effect rendering process according to the second modification example of the present embodiment.

FIG. 21 is a block diagram depicting a hardware configuration example of an information processing apparatus that implements an audience information output system, the performer information input/output system, or a performer video display system according to the embodiment of the present disclosure.

DESCRIPTION OF EMBODIMENT

Figure 2:
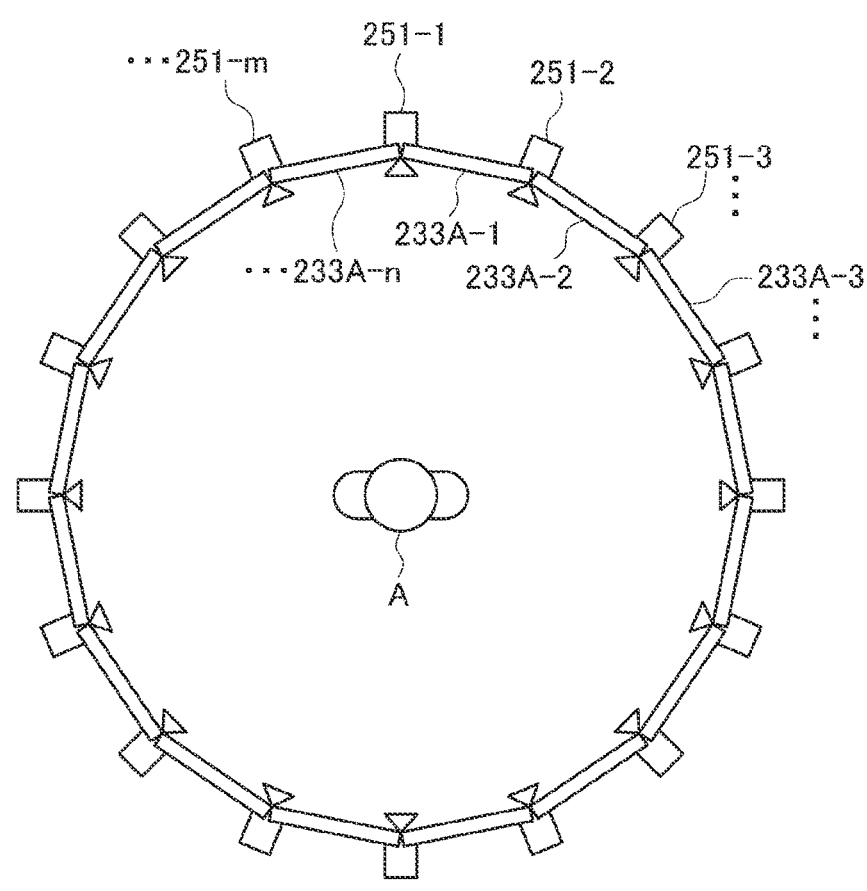
FIG. 2 is a diagram for explaining arrangement of display areas (displays) and image-capturing sections (cameras) in a studio where information for generating a 3D model of a performer is acquired according to the present embodiment.

Hereinbelow, a preferred embodiment of the present disclosure will be explained in detail with reference to the attached drawings. Note that constituent elements having a substantially identical functional configuration are given identical reference signs in the present specification and drawings, and thus, overlapping explanations are omitted.

In addition, the explanation is given in the following order.

1. Overview of Information Processing Systems according to Embodiment of Present Disclosure
2. Configuration Examples
   2-1. Audience Information Output System 1
   2-2. Performer Information Input/Output System 2
   2-3. Performer Video Display System 3
3. Operation Processes
4. Modification Examples
   4-1. First Modification Example
   4-2. Second Modification Example
5. Hardware Configuration
6. Supplementary Notes 1. Overview of Information Processing Systems According to Embodiment of Present Disclosure FIG. 1 is a diagram for explaining an overview of information processing systems according to an embodiment of the present disclosure. As depicted in FIG. 1, the information processing systems according to the present embodiment include an audience information output system 1, a performer information input/output system 2, and a performer video display system 3.

In the present embodiment, a concert (also referred to as a remote concert) in which a video of a performer captured in a studio is provided to an audience at a remote location on a real time basis is explained as an example. The performer is a person who gives a performance. In addition, the performer is an example of a subject. The remote location means a location different from a location where the performer is present. The video of the performer captured in the studio is acquired by the performer information input/output system 2, transferred to the performer video display system 3 via a network 42, and presented to the audience by the performer video display system 3.

For example, conceivable examples of the audience include audience members (first audience example) who are at a concert venue with a large capacity, such as a stadium, an arena, or a hall; audience members (second audience example) who are viewing and listening to performer videos distributed to their own display terminals (television apparatuses or PCs (Personal Computers), smartphones, tablet terminals, projectors (projection apparatuses), etc.) by using telecommunications systems; and audience members (third audience example) who are participating as avatars in a concert held in a virtual space. Note that the virtual space includes a VR (Virtual Reality) space. The audience examples explained above are examples, and the present embodiment is not limited to the first to third audience examples.

In addition, in the present embodiment, the video of the audience is acquired by the audience information output system 1, transferred to the performer information input/output system 2 via a network 41, and provided to the performer by the performer information input/output system 2. Accordingly, the performer can perform in a remote concert while watching the situation of the audience.

Here, in the performer information input/output system 2, for example, performer information is acquired by using a technology (e.g., a Volumetric Capture technology) for generating a 3D model of a subject on the basis of several dozen images which are simultaneously captured from various directions with several dozen cameras arranged to surround the subject, and generating a 3D video of the subject seen from a certain direction with a high image quality. Since the 3D video of the subject is generated from the 3D model of the subject in such a technology, for example, a video of a viewpoint (virtual viewpoint) of a camera which is actually not present can be generated, and freer viewpoint manipulation from the distributor side or the audience side becomes possible. Whereas the performer is used as an example of the subject in the present embodiment, the present disclosure is not limited to this, and the subject is not limited to persons. Examples of the subject widely include image-capturing objects such as animals, insects, automobiles, airplanes, robots, or plants. The performer information input/output system 2 according to the present embodiment transmits, as a video of the performer, the 3D video generated from the 3D model of the performer to the performer video display system 3.

(Sorting Out Problems)

When an 3D model of a subject is generated from captured images, it is necessary to extract regions of the subject (silhouette images of the subject) from the captured images. In order to make it easier to extract the regions of the subject, a green screen or a blue screen is used typically. However, it becomes difficult to present, to around the subject, a video other than the green screen or the like.

For example, when a remote concert like the ones mentioned above is given, the performer can perform interactive actions while watching the situation of the audience, if a video of the audience also can be presented to the performer on a real time basis, and this gives the audience a more highly entertaining experience. It is desired to give a higher sense of being at a real concert also to the performer who is at the recording in a studio to generate the 3D model.

In view of this, in the embodiment according to the present disclosure, a timing control unit 24 of the performer information input/output system 2 performs control (time division control at a high rate) such that an image-capturing timing when images of the performer are captured from around her/him and a display timing when an audience video is displayed around the performer are shifted from each other, and it thus becomes possible to pursue both image-capturing for generation of a 3D model of the performer and visual recognition of the audience video by the performer.

Figure 3:
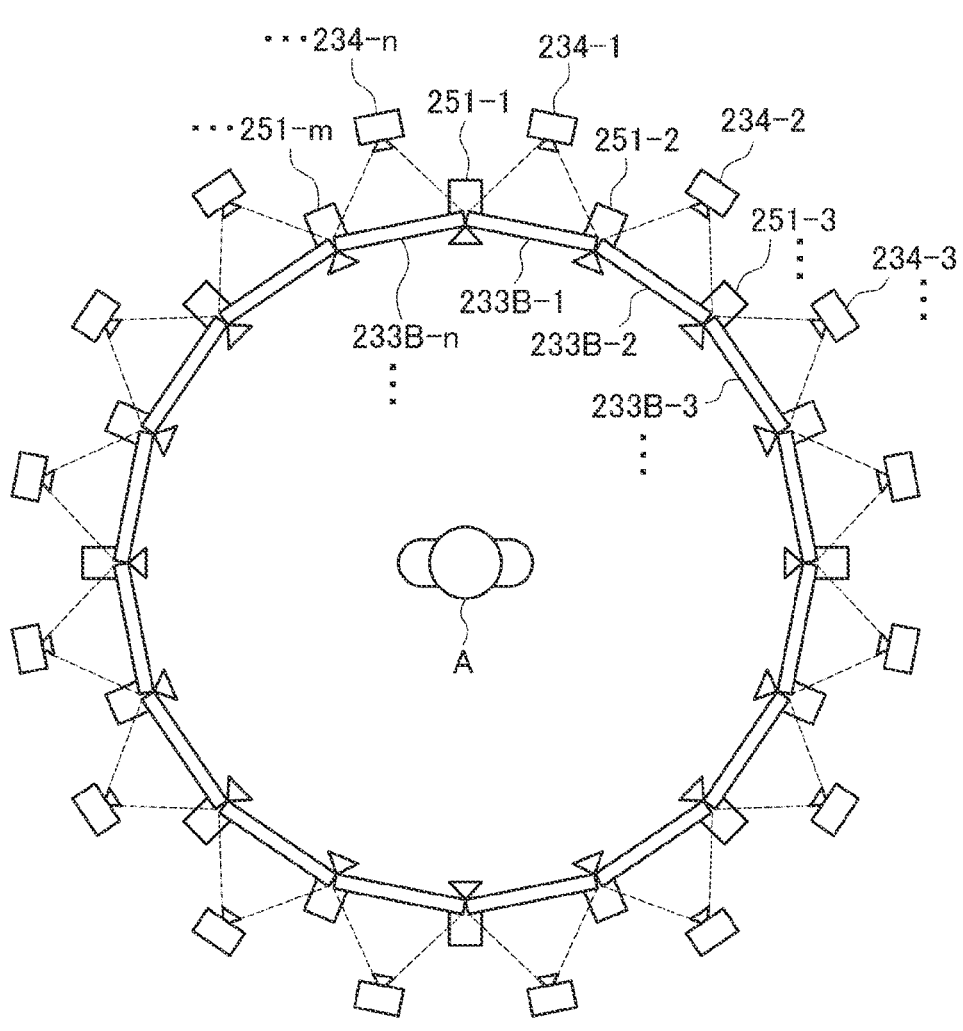
FIG. 3 is a diagram for explaining arrangement of display areas (screens) and image-capturing sections (cameras) in a studio where information for generating a 3D model of a performer is acquired according to the present embodiment.

FIG. 2 and FIG. 3 are diagrams for explaining arrangement of display areas (display regions) 233 (e.g., displays or screens) and image-capturing sections 251 (cameras) in a studio where information for generating a 3D model of a performer is acquired according to the present embodiment. As depicted in FIG. 2, for example, around a performer A (e.g., circularly), m cameras are arranged as the image-capturing sections 251, and further, displays (e.g., LED displays) are arranged as display areas 233A to fill the spaces between the cameras. In addition, in another example, as depicted in FIG. 3, screens (display areas 233B) for projectors may be arranged at locations where green screens had conventionally been placed, and short focus rear projectors (projectors 234) may be disposed behind the screens. Note that conceivable examples of the screens include colored screens (e.g., green screens), for example. In addition, whereas the n display areas 233 and the m image-capturing sections 251 are arranged circularly in the examples depicted in FIG. 2 and FIG. 3, they may be arranged to form a quadrangle or another shape, and the arrangement shapes of the image-capturing sections 251 and display areas 233 may also be different from each other. In addition, the image-capturing sections 251 and the display areas 233 may not only be provided in one line around the performer A, but also be provided in multiple lines that are next to each other in the up-down direction.

In this manner, the display areas 233 and the image-capturing sections 251 are arranged around the performer A, and the image-capturing timing and the display timing when the audience video is displayed are shifted from each other. Hence, it becomes possible to pursue both image-capturing for 3D model generation and displaying of the audience video. That is, the timing control unit 24 of the performer information input/output system 2 controls the timings such that displaying is turned off when image-capturing is performed, and image-capturing is turned off when displaying is performed. Accordingly, when displaying is turned off, LEDs of LED displays are turned off, and the background becomes a black screen, or the original colors (e.g., green) of the screens become the background. Thus, captured images that make it easier to extract regions of the performer can be acquired.

As explained above, when a remote concert is given, a free viewpoint 3D video of the performer is generated and provided to the audience while an audience video is presented to the performer. This can give a more highly entertaining experience by allowing the performer to perform interactive actions to the audience video while watching the situation of the audience, and so on.

Note that the present system is applied not only to concerts, but also widely to cases where interactive actions are performed via videos in games, telecommunications, or the like. In addition, although sounds are not mentioned in the present system, sounds are processed separately at a time of implementation, and sounds of the performer and sounds of the audience can be transferred to the audience side and the performer side, respectively. For example, the sounds of the performer can be encoded together with a performer video, sent to the performer video display system 3, and sound-output along with the performer video by the performer video display system 3 (also having a sound output function).

The overview of the information processing systems according to the embodiment of the present disclosure has been explained thus far. Next, a specific configuration of each apparatus included in the information processing systems according to the present embodiment is explained with reference to figures.

2. Configuration Examples

2-1. Audience Information Output System 1

As depicted in FIG. 1, the audience information output system 1 has an audience information acquiring unit 10 and a transmitting unit 20. The audience information output system 1 may include multiple information processing apparatuses or may be a single information processing apparatus. It is assumed herein that the audience information output system 1 may be applied to an apparatus (or a system including multiple apparatuses) that performs a process of acquiring an audience video at each concert venue, or applied to a display terminal (information processing apparatus) used by each member of the audience.

(Audience Information Acquiring Unit 10)

The audience information acquiring unit 10 acquires a video (live-action video) of an audience member or acquires motion information regarding each body part of an avatar in a case where the audience member is the avatar. The audience information acquiring unit 10 also acquires audience attribute information (e.g., image-capturing conditions (information regarding cameras, etc.), genders, ages, geographical regions, venue information, fan club membership information, enthusiasm analyzed online, etc., regarding the audience).

Case of Audience Example 1 (Concert Venue)

In a case where the audience is an audience at a concert venue with a large capacity such as a stadium, an arena, or a hall, the audience information acquiring unit 10 captures images of a wide range of audience seats as an audience video, and generates a wide-field-of-view video. Specifically, for example, the audience information acquiring unit 10 may generate a wide-field-of-view video by performing a stitching process (joining process) on videos captured with multiple monocular cameras (multiple pieces of video data captured in different areas) or may use an instrument dedicated for wide-field-of-view image-capturing, such as an omnidirectional 360-degree camera. In addition, the audience information acquiring unit 10 may perform a process (data format conversion process) of processing a wide-field-of-view video into a form according to any of various formats (e.g., an equidistant cylindrical format or a cubemap format), and then output the video thus obtained, as an audience video.

Case of Audience Example 2 (Viewing and Listening on Their Own Display Terminals)

In a case where the audience is an audience viewing and listening on their own display terminals at home and so on by using telecommunications systems, the audience information acquiring unit 10 captures images of the audience with monocular cameras mounted on PCs or smartphones, as audience videos, and outputs them as audience videos.

Case of Audience Example 3 (Avatars in Virtual Space)

In a case where the audience is an audience participating as avatars in a concert held in a virtual space generated as a 3DCG or the like (in which a 3D video of the performer is displayed), the audience information acquiring unit 10 acquires motion information regarding the avatars (3DCG characters) of the audience members. The motion information is information representing a motion of (information for moving) each body part of the avatar. Conceivable examples of the display devices with which virtual space videos are viewed and listened to include nontransparent HMDs (Head Mounted Displays) that cover fields of view entirely, for example. On the basis of signals acquired from various sensors (a sound collecting unit, an RGB camera, an eye tracking sensor, an IMU (Inertial Measurement Unit) sensor, etc.) provided to each HMD, the audience information acquiring unit 10 can predict motions of corresponding body parts, and output the motions as avatar motion information (motion capture data). In order to predict motions of the corresponding body parts, technologies such as machine learning may be used. Specifically, for example, the audience information acquiring unit 10 generates a motion of the mouth (of an avatar) on the basis of a sound signal of an utterance acquired from the sound collecting unit, generates a facial expression (of the avatar) on the basis of an image signal acquired from the RGB camera, generates an eye motion (of the avatar) on the basis of a near-infrared LED signal acquired from the eye tracking sensor, and generates a translational or rotational motion of the head of (the avatar) on the basis of signals, from an acceleration sensor and a gyro sensor, acquired with the IMU sensor. Note that the display devices for allowing the audience to view and listen to virtual space videos and the various sensors mentioned above are examples, and the present embodiment is not limited to them. Various sensors may be attached to hands and feet of the audience, or various sensors may be disposed around the audience. In addition, the audience may use remote controllers to manipulate motions of their own avatars.

(Transmitting Unit 20)

The transmitting unit 20 transmits the audience videos or audience avatar motion information to the performer information input/output system 2 via the network 41 along with the audience attribute information.

Specifically, for example, the transmitting unit 20 may function as an encoding section and a multiplexing section. For example, the encoding section individually encodes the audience video or the audience avatar motion information, and the audience attribute information. Next, the multiplexing section performs a process of multiplexing encoded streams (an audience video encoded stream or an avatar motion stream, and an audience attribute information stream), and data-transmits them to the performer information input/output system 2.

A video compression process (e.g., AVC (H.264), HEVC (H.265), etc.) may be applied as the encoding of the audience videos. In addition, encoding specialized for rig configuration (bone-like elements) of avatars (such as 3DCG) or the like may be applied as the encoding of the avatar motion information. In addition, a dedicated encoding process may be applied as the encoding of the audience attribute information.

2-2. Performer Information Input/Output System 2

As depicted in FIG. 1, the performer information input/output system 2 has a receiving unit 21, a distribution display data generating unit 22, a display processing unit 23, the timing control unit 24, a video acquiring unit 25, a performer information generating unit 26, and a transmitting unit 27. The performer information input/output system 2 may include multiple information processing apparatuses or may be a single information processing apparatus. In addition, the distribution display data generating unit 22, the display processing unit 23, the timing control unit 24, the video acquiring unit 25, and the performer information generating unit 26 may be examples of functions of a control section of the performer information input/output system 2. In addition, the receiving unit 21 and the transmitting unit 27 may be examples of functions of a communication section of the performer information input/output system 2.

In addition, the display processing unit 23 can perform a process of displaying in display areas achieved by display devices (displays or projectors). In addition, the video acquiring unit 25 includes acquisition of video signals with cameras. Note that the configuration of the performer information input/output system 2 will be explained below also with reference to block diagrams depicted in FIG. 4, FIG. 7, and FIG. 8, as appropriate. FIG. 4 is a block diagram mainly depicting a specific configuration example of the display processing unit 23 of the performer information input/output system 2 according to the present embodiment. FIG. 7 is a block diagram mainly depicting a specific configuration example of the video acquiring unit 25 of the performer information input/output system 2 according to the present embodiment. FIG. 8 is a block diagram mainly depicting a specific configuration example of the performer information generating unit 26 of the performer information input/output system 2 according to the present embodiment.

(2-2-1. Receiving Unit 21)

The receiving unit 21 receives the audience videos (or avatar motion information) and the audience attribute information from the audience information output system 1, and outputs them to the distribution display data generating unit 22.

Specifically, for example, the receiving unit 21 functions as a demultiplexing section and a decoding section. As the demultiplexing section, the receiving unit 21 separates the data received from the audience information output system 1, into an audience video encoded stream or an avatar motion stream, and an audience attribute information stream, and outputs them to the decoding section. Next, the decoding section performs decoding processes with corresponding decoders. Specifically, the decoding section performs a decoding process on the input audience video encoded stream, and outputs it as audience video information. Alternatively, the decoding section performs a decoding process on the input avatar motion stream, and outputs it as avatar motion information. In addition, the decoding section performs a decoding process on the audience attribute information stream, and outputs it as audience attribute information.

(2-2-2. Distribution Display Data Generating Unit 22)

The distribution display data generating unit 22 generates distribution display data (video signals) to be displayed and distributed to multiple display areas 233 (see FIG. 2 and FIG. 3) arranged around the performer, on the basis of the audience video information input from the receiving unit 21, and outputs the distribution display data to the display processing unit 23. Here, in a case where audience videos are sent from multiple concert venues, the distribution display data generating unit 22 may output an audience video of a concert venue chosen by the performer. In addition, in a case where an audience video of each person is sent by a telecommunications system, the distribution display data generating unit 22 may output audience videos corresponding to attributes (e.g., an age bracket, a gender, particular membership numbers, etc.) chosen by the performer. In addition, in a case where avatar motion information regarding an audience participating in a concert held in a virtual space is sent, the distribution display data generating unit 22 may control the motion of each avatar according to the motion information, and may also generate a video (a field of view including avatars of the audience members) as seen from the performer's viewpoint in the virtual space (e.g., from a stage in the virtual space) and output the video as an audience video.

Hereinbelow, a specific explanation is given with reference to FIG. 4. As depicted in FIG. 4, audience video information 510 and audience attribute information 520 that are decoded by the receiving unit 21, pre-generated studio attribute information 530 (e.g., the types, sizes, and number of display devices, a relative positional relation between a performer and the display devices, the ambient brightness, etc.), and performer interaction information 540 are input to the distribution display data generating unit 22. The performer interaction information 540 is generated on the basis of manipulations, gestures, or the like made by the performer, and includes information regarding a venue or audience attributes chosen by the performer. For example, the performer interaction information 540 is generated in the performer information input/output system 2 by analysis of utterance sounds of the performer, by analysis of gestures (pointing with a finger, etc.) on captured images, by button manipulations by the performer (a switch provided to a microphone held by the performer, etc.), by manipulations by staffs on the distributor side, and so on, and is input to the distribution display data generating unit 22. By providing a switch or the like to a microphone held by the performer, it is possible for the performer to execute a manipulation without a sense of discomfort even during a concert performance. In addition, some of dance movements by the performer may be recognized on an image, with a sensor, and so on, and the performer interaction information may reflect results of the recognition.

Taking the performer interaction information into consideration, the distribution display data generating unit 22 determines a display mode (data selection, position, size, direction, etc.) for the display processing unit 23 on the downstream side. In addition, according to the determined display mode, the distribution display data generating unit 22 processes an audience video or the like, and outputs the processed video signal or the like to the display processing unit 23 as distribution display data (data to be displayed and distributed to the multiple display areas 233). Hereinbelow, each of the first to third audience examples will specifically be explained as for functions of the distribution display data generating unit 22.

Case of First Audience Example (Concert Venue)

In a case where the audience is an audience at a concert venue with a large capacity, such as a stadium, an arena, or a hall, the distribution display data generating unit 22 can function as an audience venue selecting section and a data generating section. It is conceivable that, in the first audience example, a concert is distributed for multiple different concert venues. In this case, the performer who is giving a concert performance in a studio can also communicate with a particular concert venue (e.g., a call or talk for a particular concert venue). If the performer chooses a particular concert venue, the concert venue is selected by the audience venue selecting section, and an audience video of the concert venue is processed as appropriate by the data generating section. Next, the processed data (video signal) is output to the display processing unit 23, and is displayed in the display areas 233 by the display processing unit 23.

More specifically, the audience venue selecting section selects audience video information regarding the concert venue chosen by the performer from among multiple different concert venues, and audience attribute information that accompanies the audience video information, on the basis of the performer interaction information (including identification information regarding the venue chosen by the performer), and outputs them to the data generating section on the downstream side.

The data generating section processes the selected audience video information such that a video of the audience as seen from the viewpoint of the performer is displayed in an actual size, while taking into consideration conditions (e.g., the types, sizes, and number of display areas, a relative positional relation between the performer and the display areas, the ambient brightness, etc.) of displaying to the performer which are represented by the studio attribute information 530 and audience image-capturing conditions (e.g., the positions of cameras, FOVs (Fields of View), etc.) which are represented by the selected audience attribute information, and outputs results of the processing as distribution display data.

Note that, at a time when any particular concert venue has not been chosen, the audience venue selecting section may regularly select one or more concert venues randomly or may select all concert venues. Accordingly, audience videos of one or more concert venues are displayed while being switched regularly in the display areas 233 randomly, or audience videos of all concert venues are displayed in the display areas 233, for example.

Case of Second Audience Example (Viewing and Listening on Their Own Display Terminals)

In a case where the audience is an audience viewing and listening on their own display terminals at home and so on by using telecommunications systems, the distribution display data generating unit 22 can function as an audience grouping analyzing/selecting section and a data generating section. It is conceivable that, in the second audience example, a concert is distributed for an audience at home using telecommunications systems. In this case, it is also possible for the performer giving a concert performance in a studio to communicate (a call or a talk for a particular audience group) with the particular audience group (e.g., a female group, a child group, an adult group, a group of residents of a particular geographical region, an excited fan group, a glass-wearer group, etc.). The audience grouping analyzing/selecting section selects audience videos of audience members belonging to an audience group specified (chosen) by the performer, and the data generating section processes the selected audience videos as appropriate. Next, the processed data (video signal) is output to the display processing unit 23, and is displayed in the display areas 233 by the display processing unit 23.

More specifically, the audience grouping analyzing/selecting section selects audience video information regarding the audience group specified (chosen) by the performer from among the audience groups and audience attribute information that accompanies the audience video information, on the basis of performer interaction information (including identification information regarding the audience group specified by the performer), and outputs them to the data generating section on the downstream side. Note that the audience grouping analyzing/selecting section may perform grouping on the basis of pre-registered audience information (which can also be included in audience attribute information) or may perform grouping on the basis of information obtained by analyzing individual audience videos (ages, genders, and facial expressions obtained by a face recognition technology, the degrees of excitement obtained by analyzing head motions, etc.). In a case of grouping based on temporally changing information (e.g., the degree of lifting, facial expressions, etc.), the grouping may be performed at all times or may be performed in a case where performer interaction information is input.

The data generating section processes the selected audience video information such that, for example, the face of each member of the audience is tile-displayed in a visually recognizable size, while taking into consideration conditions (e.g., the types, sizes, and number of display areas, a relative positional relation between the performer and the display areas, the ambient brightness, etc.) of displaying to the performer which are represented by the studio attribute information 530 and audience image-capturing conditions (e.g., the positions of cameras, FOVs (Fields of View), etc.) which are represented by the selected audience attribute information, and outputs results of the processing as distribution display data.

Note that, when any particular audience group has not been specified (chosen), the audience grouping analyzing/selecting section may regularly select one or more audience groups randomly or may select the entire audience. Accordingly, audience videos of one or more audience groups are displayed while being switched regularly in the display areas 233 randomly, or audience videos of the entire audience are displayed in the display areas 233, for example.

Case of Third Audience Example (Avatars in Virtual Space)

In a case where the audience is an audience participating as avatars in a concert held in a virtual space generated as a 3DCG or the like (in which a 3D video of the performer is displayed), the distribution display data generating unit 22 can function as a performer's viewpoint moving section and a data generating section. In the third audience example, a concert can be held by displaying a 3D video (volumetric image) of the performer in a virtual space on a real time basis. The audience views and listens to a video of the concert (from viewpoints of the audience in the virtual space (e.g., viewpoints of avatars of the audience members or viewpoints from which avatars of the audience members can be seen in the fields of view)) being held in the virtual space, by wearing HMDs to cover their fields of view on their heads, for example. In addition, in a studio where the performer is giving a performance, videos as seen from the performer's viewpoint in the virtual space (e.g., a view of audience seats where avatars are seated, as seen from a stage in the virtual space) are displayed in the display areas 233 around the performer, and the performer can give a concert performance while watching the situation of the audience. In this case, it is also possible for the performer to approach and communicate with particular avatars. The performer's viewpoint moving section identifies avatars specified (chosen) by the performer, and the data generating section renders a video of the identified avatars, so that an audience video can be generated such that it appears as if the viewpoint of the performer were approaching the avatars in the virtual space. Next, the generated data (video signal) is output to the display processing unit 23, and is displayed in the display areas 233 by the display processing unit 23.

More specifically, the performer's viewpoint moving section identifies avatars specified (chosen) by the performer, on the basis of performer interaction information (including identification information regarding the avatars that the performer intends to approach), selects information regarding the avatars (motion information or information for displaying the avatars, such as a 3DCG) and audience attribute information that accompanies it, and outputs them to the data generating section on the downstream side.

The data generating section generates a video such that it appears as if the performer were approaching the particular avatars in the virtual space, while taking into consideration conditions (e.g., the types, sizes, and number of display areas, a relative positional relation between the performer and the display areas, the ambient brightness, etc.) of displaying to the performer which are represented by the studio attribute information 530 and rendering conditions of the identified avatars (e.g., the positions, directions, and sizes of the avatars in the virtual space, material information regarding the texture, lighting, etc.) which are represented by the selected audience attribute information, and outputs results of the generation as distribution display data.

(2-2-3. Display Processing Unit 23)

The display processing unit 23 performs a process of separating distribution display data (video signals) output from the distribution display data generating unit 22, and displaying it in the multiple display areas 233. Hereinbelow, a specific explanation is given with reference to FIG. 4.

As depicted in FIG. 4, the display processing unit 23 has a video signal separating section 231, multiple video processing sections 232, and multiple display areas 233. The video signal separating section 231 separates distribution display data (video signals) output from the distribution display data generating unit 22, into pieces of data for each display area, and outputs pieces of the separated data to the multiple video processing sections 232 each of which perform display control for a display area. Each video processing section 232 performs control to perform correction on the received data (separated data) as appropriate and then display the received data in the corresponding display area 233.

An audience video displayed in the multiple display areas 223 is a captured video of an audience at a concert venue with a large capacity in a case of the first audience example as mentioned above. In addition, in a case of the second audience example, the audience video may be a video in which videos like video chat screens (videos of the audience captured with cameras of PCs) of a telecommunications system are arranged in tiles, for example. In addition, in a case of the third audience example 3, the audience video is a video as seen from the performer's viewpoint in the virtual space. The video as seen from the performer's viewpoint may be a video of a field of view (including avatars of the audience members) from the position of the face (eyes) of a 3D video (a 3D video of live-actions generated from a 3D model of the performer; volumetric images) in which the performer is arranged as a performer avatar in the virtual space. In addition, the performer's viewpoint may be a viewpoint from which both the performer avatar and the audience avatars can be seen in the field of view, as seen from a position which is a little away from the performer avatar (3D video) (e.g., from behind the performer avatar, etc.).

Here, each video processing section 232 according to the present embodiment displays an audience video at a timing based on display timing information 551 input from the timing control unit 24. A timing of display ON represented by the display timing information 551 and a timing of image-capturing ON represented by image-capturing timing information 552 output from the timing control unit 24 to a captured-image acquiring unit 25 are shifted (made differ-ent) from each other. Because of this, in the present embodi-ment, it becomes possible to turn off displaying at the timing of image-capturing ON, and it becomes possible to acquire, with the captured-image acquiring unit 25, a captured image suitable for generation of a 3D model of the performer. Note that, since the multiple video processing sections 232 con-trol the display timing (control display rates) according to the identical display timing information 551, timings of displaying in all the display areas 233 (display areas 233-1 to 233-n) can be synchronized (the displaying is entirely turned on and off at the same timing).

The display areas 233 may be the display areas 233A achieved by displays depicted in FIG. 2 or may be the display areas 233B achieved by screens depicted in FIG. 3. In a case of screens, displaying in the display areas 233B can be performed by the projectors 234.

In addition, the video signal separating section 231 and the multiple video processing sections 232 may be imple-mented by information processing apparatuses each of which is communicatively connected with a display or a projector. Alternatively, the receiving unit 21, the distribu-tion display data generating unit 22, the video signal sepa-rating section 231, the multiple video processing sections 232, and the timing control unit 24 may be implemented by an information processing apparatus that is communica-tively connected with many displays or projectors.

Hereinbelow, a further detailed explanation is given.

Video Signal Separating Section 231

In a case where, as a data (video signal) separation method, for example, an audience video is displayed on multiple single-body LED displays (display areas 233A-1 to 233A-n) or multiple screens for projector projection (display areas 233B-1 to 233B-n) that are linked together, the video signal separating section 231 distributes video signals cor-responding to the respective displays or screens, according to the arrangement of the displays or screens.

Note that, in a case where separate displays or screens are not used (in a case where a single display or screen is used), the video signal separating section 231 may configure an audience video such that it corresponds to multiple display areas set in one display region on the display or screen.

Video Processing Section 232

For example, the video processing section 232 can func-tion as a brightness correcting portion 2320a, a color cor-recting portion 2320b, and a display rate control portion 2320c. Note that correction explained here is an example, and the present embodiment is not limited to this. In addition, the correction need not necessarily be performed.

For example, the video processing section 232 appropri-ately performs video brightness correction by using the brightness correcting portion 2320a or video color correc-tion by using the color correcting portion 2320b, on sepa-ration data input from the video signal separating section 231 (video signals separated according to display areas), depending on a display rate specified with the display timing information 551 separately input from the timing control unit 24.

Specifically, in a case where the display areas 233 are LED displays, LEDs are turned off while black screens are displayed in a period of time in which a video is not being displayed (no-display period). This causes a phenomenon in which, as the length of a no-display period increases, a video looks darker since humans perceive visual information in a temporally integrated manner. Accordingly, as depicted on the left side in FIG. 5, the brightness correcting portion 2320a corrects the brightness of separation data such that the degree of emphasis of the brightness correction of the displays increases as the length of a no-display period increases. On the other hand, in a case of projector projec-tion on colored screens (e.g., green screens), as a period of time in which projection of a video is not being performed (e.g., by attaching liquid crystal shutters or the like to the projectors) increases, the video looks greenish undesirably since humans perceive visual information in a temporally integrated manner. Accordingly, as depicted on the right side in FIG. 5, the color correcting portion 2320b corrects the color of separation data such that the degree of emphasis of the color correction of the projectors increases as the length of a no-display period increases. Any one of or both the brightness correction and the color correction may be per-formed depending on the types or the like of the display areas 233.

In addition, actual adjustments of the correction intensity may be made in advance by causing a test signal to be displayed at an expected display rate, and pre-setting cor-rection parameters by manually and visually adjusting brightness and colors. In addition, images of the display areas 233 may be captured with separate cameras, and the brightness correcting portion 2320a and the color correcting portion 2320b may automatically perform correction by using the captured images.

Then, the display rate control portion 2320c controls displaying of the corrected video in corresponding display areas 233 such that it is displayed at a display rate specified with the display timing information 551. Specifically, in a case of LED displays, the display rate control portion 2320c controls turning on and off of LEDs, and in a case of projectors, the display rate control portion 2320c controls opening and closing of liquid crystal shutters provided to the projectors.

Note that, in a case where the direction of the performer (the direction she/he looks) has been determined in advance (a case where the front direction has been decided or in other cases), the display processing unit 23 need not display a video in all display areas, and may intend to save electric power by keeping display areas at positions in the blind spot of the performer turned off (display OFF).

(2-2-4. Timing Control Unit 24)

The timing control unit 24 performs control to generate the display timing information 551 and output it to the display processing unit 23, and at the same time, to generate the image-capturing timing information 552 and output it to the video acquiring unit 25. Specifically, the timing control unit 24 generates timing information for shifting (making different) the timing of display ON and the timing of image-capturing ON, and outputs it.

FIG. 6 is a diagram depicting an example of control of timings of display ON/OFF and image-capturing ON/OFF according to the present embodiment. In the present embodiment, as depicted in FIG. 6, control is performed in such a manner as to turn off displaying when image-capturing is turned on, and turn on displaying when image-capturing is turned off. Accordingly, it becomes possible to perform image-capturing with the image-capturing sections (cameras) that acquire information for generating a 3D model of a performer who is a subject, when displaying is turned off in a state where the background of the performer is black screens or green screens, as mentioned above.

More specifically, the timing control unit 24 generates display timing information (display synchronization signal) for turning on displaying of an audience video when image-capturing for generating a 3D model of a performer is turned off, and outputs the display timing information to the display processing unit 23, while the timing control unit 24 generates image-capturing timing information (image-capturing synchronization signal) for turning off displaying of an audience video when image-capturing for generating a 3D model of a performer is turned on, and outputs the image-capturing timing information to the video acquiring unit 25.

Note that the frequency above which a display ON timing is deemed to have come is desirably set to a frequency which is equal to or higher than a critical flicker frequency (approximately 30 to 40 Hz) in order not to perceive flicker. That is, the timing control unit 24 executes audience video display control at a display rate (high rate) which at least satisfies the critical flicker frequency.

In addition, in order to provide transition time for switching from ON to OFF (or OFF to ON) in which a time lag can actually occur in each piece of equipment such as a display or a camera, for example, an image-capturing rate control portion 2510$a$ (see FIG. 7) of the video acquiring unit 25 may adjust the shutter speeds of the cameras (image-capturing sections) and set exposure time such that it becomes shorter than an ON period in the image-capturing timing depicted in FIG. 6. In addition, similarly, the display rate control portion 2320$c$ also sets turning on of LEDs (or opening time of the liquid crystal shutters of projectors) such that it becomes shorter than an ON period in the display timing.

(2-2-5. Video Acquiring Unit 25)

The video acquiring unit 25 has a function of acquiring a video (captured image) for generating a 3D model of a performer. The video acquiring unit 25 captures (control of shutters) images of the performer simultaneously from various angles according to the image-capturing timing information 552 input from the timing control unit 24 with many (e.g., several dozen) cameras (the image-capturing sections 251) arranged around the performer as depicted in FIG. 2 or FIG. 3, and acquires many captured images. In addition, the video acquiring unit 25 integrates the many captured images, and outputs the integrated image as multi-viewpoint data to the performer information generating unit 26 that performs generation of a 3D model of the performer or the like. Note that the cameras (image-capturing sections 251)

may include various devices that sense depth information. In this case, the multi-viewpoint data may include not only RGB signals, but also depth signals or sensing signals (e.g., infrared signals) which are source signals of the depth signals.

Hereinbelow, a further detailed explanation is given with reference to FIG. 7. FIG. 7 is a block diagram mainly depicting a specific configuration example of the video acquiring unit 25 of the performer information input/output system 2 according to the present embodiment.

As depicted in FIG. 7, the video acquiring unit 25 includes multiple image-capturing sections (cameras) 251 and a multi-viewpoint data generating section 252. For example, the multi-viewpoint data generating section 252 and the performer information generating unit 26 may be implemented by an information processing apparatus that is communicatively connected with the many image-capturing sections 251 (cameras). Alternatively, the timing control unit 24, the multi-viewpoint data generating section 252, the performer information generating unit 26, and the transmitting unit 27 may be implemented by an information processing apparatus that is communicatively connected with the many image-capturing sections 251 (cameras).

As depicted in FIG. 7, each image-capturing section 251 has functions of the image-capturing rate control portion 2510$a$, a captured-image signal acquiring portion 2510$b$, and a signal correcting portion 2510$c$. The image-capturing rate control portion 2510$a$ outputs, to the captured-image signal acquiring portion 2510$b$ on the downstream side, information such as a shutter speed or an aperture value according to an image-capturing rate represented by the image-capturing timing information 552 input from the timing control unit 24. The captured-image signal acquiring portion 2510$b$ captures an image of a subject (performer) with various camera parameters such as a shutter speed or an aperture value, acquires the captured image (captured-image signal), and outputs the captured image to the signal correcting portion 2510$c$ on the downstream side. The signal correcting portion 2510$c$ performs various signal correction processes such as noise reduction, a resolution transformation process, or a dynamic range conversion, and outputs the corrected captured image to the multi-viewpoint data generating section 252. Note that the details of the correction are not limited to them, and the entire correction described here need not necessarily be performed.

In addition, the captured image to be output to the multi-viewpoint data generating section 252 may be only RGB signals of an image captured with an RGB camera or may be signals including depth signals acquired with various depth sensors and sensing signals (e.g., infrared signals) which are source signals of the depth signals.

The multi-viewpoint data generating section 252 integrates input captured images of respective viewpoints (e.g., several dozen captured images), and outputs the integrated captured image as multi-viewpoint data 560 to the performer information generating unit 26.

(2-2-6. Performer Information Generating Unit 26)

The performer information generating unit 26 generates a 3D model of a performer on the basis of the multi-viewpoint data 560 input from the video acquiring unit 25, generates a performer video (e.g., a live-action 3D video of the performer) from the 3D model, and outputs the performer video to the transmitting unit 27. In addition, the performer information generating unit 26 generates performer's gaze information representing which audience member (or audience avatar) displayed in the multiple display areas 233 the performer is looking at, from the three-dimensional position or direction of the performer detected from the multi-viewpoint data 560 (e.g., six patterns of motion which are a motion of the line of sight in the up-down direction, a motion of the line of sight in the left-right direction, a motion to incline the head, a movement of the body in the front-back direction, a movement of the body in the left-right direction, and a movement of the body in the up-down direction) and from display area arrangement information 570 representing the arrangement of display areas, and outputs the performer's gaze information to the transmitting unit 27.

The details of the performer information generating unit 26 are explained with reference to FIG. 8. FIG. 8 is a block diagram mainly depicting a specific configuration example of the performer information generating unit 26 of the performer information input/output system 2 according to the present embodiment.

As depicted in FIG. 8, the performer information generating unit 26 functions as a pre-processing section 263, a performer video generating section 261, and a performer's gaze information generating section 262.

The pre-processing section 263 performs processes such as calibration or image-capturing-subject silhouette extraction (foreground-background separation), and outputs pre-processed multi-viewpoint data to the performer video generating section 261 and performer's gaze information generating section 262 on the downstream side.

The performer video generating section 261 can generate a 3D model of a performer (3D modeling data) on the basis of the pre-processed multi-viewpoint data, and generate, from the 3D model, a 2D performer video (free viewpoint video) which is rendered to reproduce a video from a certain viewpoint, or data (data including 3D modeling data and texture data) for rendering for a 3D performer video aimed for 3D display viewing and listening as a stereographic hologram or on a 3D display, an HMD, or the like.

Modeling

The performer video generating section 261 has a function of a modeling section that generates a 3D model. The modeling section generates 3D modeling data (3D model) on the basis of the pre-processed multi-viewpoint data. As a technique of 3D modeling, for example, a Shape from Silhouette technique (SFS method) like Visual Hull or a Multi-View Stereo technique (MVS method) may be used, but these are not the sole examples. In addition, the data format of 3D modeling data may be any of expression formats such as Point Cloud, voxel, or mesh, for example.

Generation of 2D Performer Video (Free Viewpoint Video)

The performer video generating section 261 further has a function of a 2D-video generating section, and can generate a 2D performer video (free viewpoint video) from a 3D model (3D modeling data). It is conceivable that, in such an example, the audience views and listens to a performer video with a 2D display. For example, it is conceivable that, in the first audience example mentioned above, a 2D performer video is presented on a large-sized screen or a large-sized display at a concert venue. In addition, it is also conceivable that, in the second audience example, each member of the audience views and listens to a 2D-displayed performer video by using a 2D display at home and so on by using a telecommunications system. In addition, it is conceivable that, in the third audience example, a performer video is 2D-displayed in a virtual space (e.g., displayed on a virtual screen).

The 2D-video generating section generates a 2D video (free viewpoint video) which is rendered to reproduce a video from a certain viewpoint, from the 3D modeling data and RGB data included in the pre-processed multi-viewpoint data, and outputs them as performer video display information. Note that the viewpoint to be set by the 2D-video generating section may be decided by a staff (the director of video production, etc.) on the distributor side or may be decided on the basis of information specified interactively from the audience side (information separately transmitted from the audience side).

Generation of Data for Rendering 3D Performer Video

The performer video generating section 261 further has a function of a 3D-video display data generating section, and can generate data for rendering a 3D performer video from the 3D model (3D modeling data). In such an example, it is conceivable that the audience views and listens to a 3D-displayed performer video as a stereographic hologram or on a 3D display, an HMD, or the like. For example, it is conceivable that, in the first audience example mentioned above, a stereographic hologram of the performer is presented as a performer video at a concert venue. In addition, it is also conceivable that, in the second audience example, each member of the audience views and listens to a 3D-displayed performer video by using a 3D display at home and so on by using a telecommunications system. In addition, it is also conceivable that, in the third audience example, a performer video is 3D-displayed in a virtual space.

The 3D-video display data generating section generates 3D texture data corresponding to the 3D modeling data, from RGB data included in the pre-processed multi-viewpoint data. Next, the 3D-video display data generating section outputs, to the transmitting unit 27, as performer video display information, 3D video display data (volumetric data) obtained by multiplexing the 3D texture data and the 3D modeling data. Note that the 3D texture data may be generated in a format taking into consideration viewpoint-dependent rendering or may include data taking into consideration the texture of the surface of a subject.

The performer's gaze information generating section 262 depicted in FIG. 8 extracts the three-dimensional position or direction of the performer detected from the pre-processed multi-viewpoint data (e.g., six patterns of motion which are a motion of the line of sight in the up-down direction, a motion of the line of sight in the left-right direction, a motion to incline the head, a movement of the body in the front-back direction, a movement of the body in the left-right direction, and a movement of the body in the up-down direction), and estimates the line-of-sight direction of the performer. Detection of the line-of-sight direction may instead use results of detection of the direction of the head of the performer (in this case, the direction of the head of the performer may be determined by analyzing the pre-processed multi-viewpoint data or may be detected by using an IMU device (Inertial Measurement Unit) worn by the performer).

Next, the performer's gaze information generating section 262 combines the line-of-sight direction of the performer and the display area arrangement information 570 representing the arrangement of the multiple display areas, to generate performer's gaze information representing which audience member (or audience avatar) displayed in the multiple display areas 233 the performer is looking at, and outputs it to the transmitting unit 27. Note that the performer's gaze information generating section 262 may generate performer's gaze information (information regarding a concert venue chosen by the performer, etc.) from performer interaction information.

In this manner, the performer information generating unit 26 outputs, as performer information, performer video display information 580 (2D video or 3D video display data) and performer's gaze information 590 to the transmitting unit 27.

(2-2-7. Transmitting Unit 27)

The transmitting unit 27 transmits the performer information (the performer video display information 580 and the performer's gaze information 590) to the performer video display system 3 via the network 42. The transmitting unit 27 may encode the performer information in a data format according to the receiver side, and then transfer the encoded data to the performer video display system 3.

For example, the transmitting unit 27 functions as a performer video encoding section, a performer's gaze information encoding section, and a data multiplexing section. The performer video encoding section encodes the performer video (2D video or 3D video display data) with a predetermined codec, and outputs it as a performer video encoded stream. In addition, the performer's gaze information encoding section encodes the performer's gaze information with a predetermined codec, and outputs it as a performer's gaze information encoded stream. Note that the codec to be used for the 3D video display data may be a Point-Cloud-based V-PCC codec standardized by MPEG or another scheme that uses mesh-data encoding in combination may be used.

The data multiplexing section multiplexes the performer video encoded stream and the performer's gaze information encoded stream, and outputs them as multiplexed data to the transmitting unit 27.

2-3. Performer Video Display System 3

As depicted in FIG. 1, the performer video display system 3 has a receiving unit 31, a display control unit 32, and a display unit 30. The performer video display system 3 may include multiple information processing apparatuses or may be a single information processing apparatus. It is assumed herein that the performer video display system 3 may be applied to an apparatus (or a system including multiple apparatuses) that performs a process of displaying a video at each concert venue, or applied to a display terminal (information processing apparatus) used by each member of the audience.

In addition, the display control unit 32 may be an example of a function of a control section of the performer video display system 3. In addition, the receiving unit 31 may be an example of a function of a communication section of the performer video display system 3. In addition, the display unit 30 is implemented by a 2D display (a PC, a smartphone, a tablet terminal, etc.), a 3D display (an HMD, etc.), a stereographic hologram presentation apparatus, or the like.

(Receiving Unit 31)

The receiving unit 31 outputs the performer information received from the performer information input/output system 2 to the display control unit 32. More specifically, the receiving unit 31 separates the multiplexed data (multiplexed performer information) received from the performer information input/output system 2, into a performer video encoded stream and a performer's gaze information encoded stream by a demultiplexing process. Next, the receiving unit 31 performs a decoding process on each of the performer video encoded stream and the performer's gaze information encoded stream with a predetermined decoder, and outputs the performer video (2D video or 3D video display data) and the performer's gaze information to the display control unit 32.

(Display Control Unit 32)

The display control unit 32 appropriately performs control to process a 2D video, generate a 3D video, and so on as necessary on the basis of the performer video (2D video or 3D video display data) and the performer's gaze information output from the receiving unit 31, and display the 2D or 3D performer video on the display unit 30.

The display control unit 32 according to the present embodiment can provide a concert performance of the performer to the audience as a more real experience by applying a special expression (stagecraft) for an audience member that the performer is gazing at, on the basis of the performer's gaze information. Hereinbelow, a specific explanation is given.

Case of 2D Performer Video

A performer video generating section 321 refers to the performer's gaze information. In a case where the performer is gazing at a certain audience member (the audience member viewing and listening to a performer video presented by the performer video display system 3), the performer video generating section 321 processes the performer video as appropriate, and generates a performer video in such a manner as to clearly represent that the audience member is being gazed at by the performer. Note that the performer's gaze information may be transmitted from the performer information input/output system 2 only to the audience member being gazed at by the performer.

FIG. 9 is a diagram depicting an example of performer's gaze expression processing on a 2D performer video according to the present embodiment. The upper side in FIG. 9 depicts an image 310 that is yet to be subjected to the gaze expression processing, and the lower side in FIG. 9 depicts images 311*a* to 311*c* that have been subjected to the gaze expression processing. For example, the image 311*a* additionally has a frame surrounding the image, thereby expressing that the performer is gazing at the audience member. In addition, in the image 311*b*, the face of the performer is zoomed up, thereby expressing that the performer is gazing at the audience member. In addition, the image 311*c* additionally has an arrow or the like emphasizing that the line of sight of the performer is toward the audience member (the performer is looking at the camera), thereby expressing that the performer is gazing at the audience member. Note that a performer video rendered to reproduce a video from such a viewpoint that the performer faces the audience member at which the performer is gazing may be generated in advance for the audience member in the performer information generating unit 26 of the performer information input/output system 2.

As described above, the audience members can recognize that the performer is giving a concert performance while gazing at them. Note that processing patterns of gaze expressions according to the present embodiment are not limited to the examples depicted in FIG. 9.

Case of 3D Performer Video

It is also conceivable that, in the present embodiment, the audience is viewing and listening to a 3D performer video as a stereographic hologram or on a 3D display, an HMD, or the like. The performer video generating section 321 can render a 3D performer video by using 3D texture data and 3D modeling data included in the decoded 3D video display data.

Figure 10:
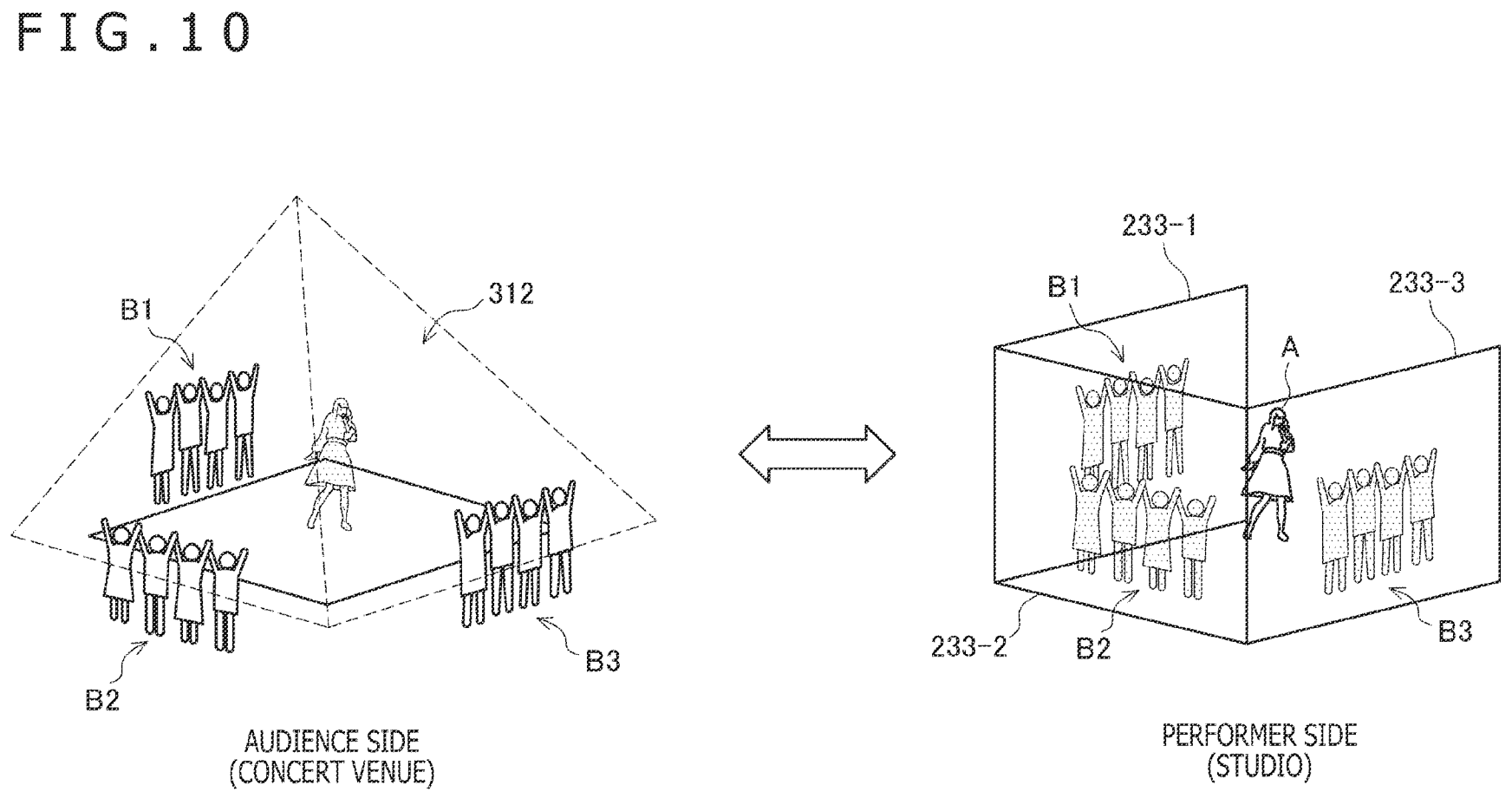

Here, in a case where it is supposed that, in the first audience example, a concert is distributed to multiple different concert venues, the performer's gaze information is information representing a concert venue that the performer is gazing at (a concert venue chosen by the performer as a concert venue she/he intends to communicate with in a particular way). In addition, in a case of the first audience example, for example, as depicted in FIG. 10, displaying may be controlled such that the consistency in terms of how the audience-side concert venue is seen and how the performer-side studio is seen (e.g., the relative positional relation between the performer and the audience, and their sizes) is maintained between them. In the example depicted in FIG. 10, for example, a 3D performer video (stereographic hologram) 312 is displayed on the stage in the concert venue, and audience crowds B1 to B3 are positioned in three directions around the stage. Images of the audience crowds B1 to B3 are each captured with a monocular camera, and a wide-field-of-view audience video formed by joining three audience videos is transmitted to the performer information input/output system 2. As depicted on the right side in FIG. 10, the performer information input/output system 2 distributes the wide-field-of-view audience video to display areas 233-1 to 233-3 positioned in the three directions around the performer A in the studio, such that the audience video corresponds to the positional relation between the performer and the audience crowds on the concert-venue side, and displays audience videos of the respective audience crowds B1 to B3. Accordingly, the consistency regarding how videos are seen on both sides is maintained.

In the following specific example of a performer's gaze expression explained with reference to FIG. 11, in a case where such display control is performed, a particular concert venue is chosen by the performer. It is supposed in the example depicted in FIG. 11 that, for example, the performer says, "Venue D!," manipulates a switch provided to a microphone that she/he is holding, points at a display area in which the venue D is being displayed, and so on, to thereby choose the venue D (concert venue D).

In this case, as depicted on the upper side in FIG. 11, in the performer-side studio, the distribution display data generating unit 22 of the performer information input/output system 2 displays videos of audience crowds $B1_D$ to $B3_D$ of the concert venue D in the display areas 233-1 to 233-3 on the basis of performer interaction information (information generated from what the performer says, switch manipulation, pointing with a finger, or the like described above). Note that the relative positional relation between the performer and the audience in the studio is controlled such that it matches the relative positional relation in the concert venue D.

On the other hand, as depicted on the lower side in FIG. 11, at multiple different concert venues (e.g., a concert venue C and the concert venue D), the 3D performer video 312 is displayed at center stages of the concert venues as stereographic holograms, for example. In addition, at each venue, the audience is positioned in three directions surrounding the center stage. Here, in a case where the concert venue D has been chosen (in a case where gaze information represents that the concert venue D is the gaze-subject concert venue), at the concert venue D, a circular stagecraft image (which may be a 3D video) is additionally displayed at the foot of the 3D performer video 312 on the center stage as depicted on the lower right side in FIG. 11. Accordingly, it becomes possible to clearly indicate to the audience at the concert venue D that they are being gazed at by the performer. Note that the performer's gaze expression method is not limited to the example depicted in FIG. 11, and an image with another shape may be displayed at the foot of the 3D performer video 312, or a 3DCG for stagecraft effects may be displayed around the performer. In addition, the gaze expression may be performed by stagecraft other than a video, such as flashing of illumination, fireworks, confetti, or sound effects at the concert venue D.

Whereas the performer's gaze expression in a case where the 3D performer video is presented at the concert venue as a 3D hologram has been explained with reference to FIG. 11, the present embodiment is not limited to this, and various performer's gaze expressions can be performed also in a case where a 3D performer video is presented by using a large screen display (or screen) as depicted in FIG. 12. In the example depicted in FIG. 12, as depicted on the lower right side in FIG. 12, on a large screen display (or screen) 30D at the concert venue D that the performer is gazing at, a frame image is displayed, the space around the performer is lit up, an image for stagecraft effects is displayed around the performer, and so on, and thus, it is possible to express that the concert venue D has been chosen.

The audience at the concert venue chosen by the performer can intuitively and visually (or auditorily) recognize that they are chosen by the performer, from various performer's gaze expressions like the ones mentioned above. Hence, they can feel an interaction with the performer and get an experience close to an actual concert.

Note that a performer's gaze expression in a case of the third audience example is also explained with reference to FIG. 13. FIG. 13 is a diagram for explaining an example of a performer's gaze expression in a case where the performer has specified particular audience avatars according to the present embodiment. The third audience example represents a case where the audience members are participating as their avatars (audience avatars) in a concert held in a virtual space. In the example depicted in FIG. 13, it is supposed that, when a performer avatar 313 (a 3D video of the performer) giving a concert performance and audience avatars participating in the concert are arranged in the virtual space, the performer specifies audience avatars T. In this case, as depicted on the right side in FIG. 14, the performer avatar 313 approaches the audience avatars T in the virtual space. On a display terminal (e.g., an HMD) of each member of the audience corresponding to the audience avatars T, rendered images to reproduce videos from the viewpoints of the audience avatars are generated and displayed in this state. Accordingly, the audience members can have a virtual experience as if the performer gave a concert performance while approaching them at an actual concert venue.

Each of the configurations of the information processing systems according to the present embodiment has been specifically explained above. In the present embodiment, a 3D model is generated from images of the performer captured in a studio, and 2D or 3D performer videos generated from the 3D model from certain viewpoints are distributed on a real time basis to the audience at remote locations. At this time, it becomes possible to pursue both displaying of audience videos in the background of the performer (around the performer), which had conventionally been green screens, and image-capturing of the performer for a 3D model generation, by performing time division control at a high rate such that the timing of the displaying and the timing of the image-capturing are shifted from each other. In addition, by informing the audience at remote locations of the situation regarding how audience videos are visually recognized by the performer, it is possible to provide an experience that allows the audience to feel interactions with the performer and that is closer to an actual concert.

3. Operation Processes

FIG. 14 is a flowchart depicting an example of a procedure of operation processes of displaying and image-capturing in the performer information input/output system 2 according to the present embodiment.

As depicted in FIG. 14, first, the receiving unit 21 of the performer information input/output system 2 receives an audience video from the audience information output system 1 (Step S103).

Next, the distribution display data generating unit 22 selects an audience venue/audience group/audience avatar on the basis of performer interaction information (Step S106), and generates distribution display data on the basis of a video of the selected audience venue/audience group or motion information regarding the selected audience avatar (Step S109).

Next, the display processing unit 23 performs control to simultaneously display the distribution display data in the multiple display areas 233 arranged around the performer, according to display timing information input from the timing control unit 24 (Step S112). Note that the displaying is performed at a timing of image-capturing OFF.

Meanwhile, the video acquiring unit 25 performs control to simultaneously perform image-capturing with the multiple image-capturing sections 251 arranged around the performer, according to image-capturing timing information input from the timing control unit 24 (Step S115). Note that the image-capturing is performed at a timing of display OFF. Accordingly, the video acquiring unit 25 can obtain captured images that make it easier to extract the silhouette of a subject.

Next, the video acquiring unit 25 extracts a silhouette image of the performer from each of the multiple captured images, and acquires multi-viewpoint data (Step S118).

Next, the performer information generating unit 26 generates a 3D model of the performer on the basis of the multi-viewpoint data, generates a 2D or 3D performer video from the 3D model (Step S121), and also generates performer's gaze information on the basis of the multi-viewpoint data (Step S124).

Then, the transmitting unit 27 transmits the performer video and the performer's gaze information to the audience side (the performer video display system 3) (Step 3127).

The operation processes according to the present embodiment have been explained thus far. Note that the procedure of operation processes depicted in FIG. 14 are an example, and the present disclosure is not limited to this.

4. Modification Examples

Next, modification examples of the information processing systems according to the present embodiment will be explained with reference to FIG. 15 to FIG. 20.

4-1. First Modification Example

In a first modification example, a function of generating a virtual 2D video in which the audience is present around the performer is added. The virtual 2D video is obtained by providing a timing at which displaying of an audience video in each display area 233 in a studio and image-capturing of the performer with each image-capturing section 251 are performed simultaneously. That is, by displaying, when an image of the performer is captured with each image-capturing section 251, an audience video in each of the display areas 233 arranged around the performer (including the background), a captured image (multi-viewpoint data for a virtual 2D video) in which the audience video appears around the performer is obtained.

FIG. 15 is a diagram depicting a configuration example of the information processing systems according to the first modification example. The system depicted in FIG. 15 additionally includes a virtual 2D video generating unit 280, a transmitting unit 281, a network 43, and a virtual 2D video display system 4 in the system depicted in FIG. 1.
(Timing Control)

A timing control unit 24_a_ according to the first modification example generates timing information including control to shift (make different) the timing of display ON and the timing of image-capturing ON, and timing information including control to synchronize (make the same) the timing of display ON and the timing of image-capturing ON, and outputs the timing information to the display processing unit 23 and the video acquiring unit 25.

Figure 16:
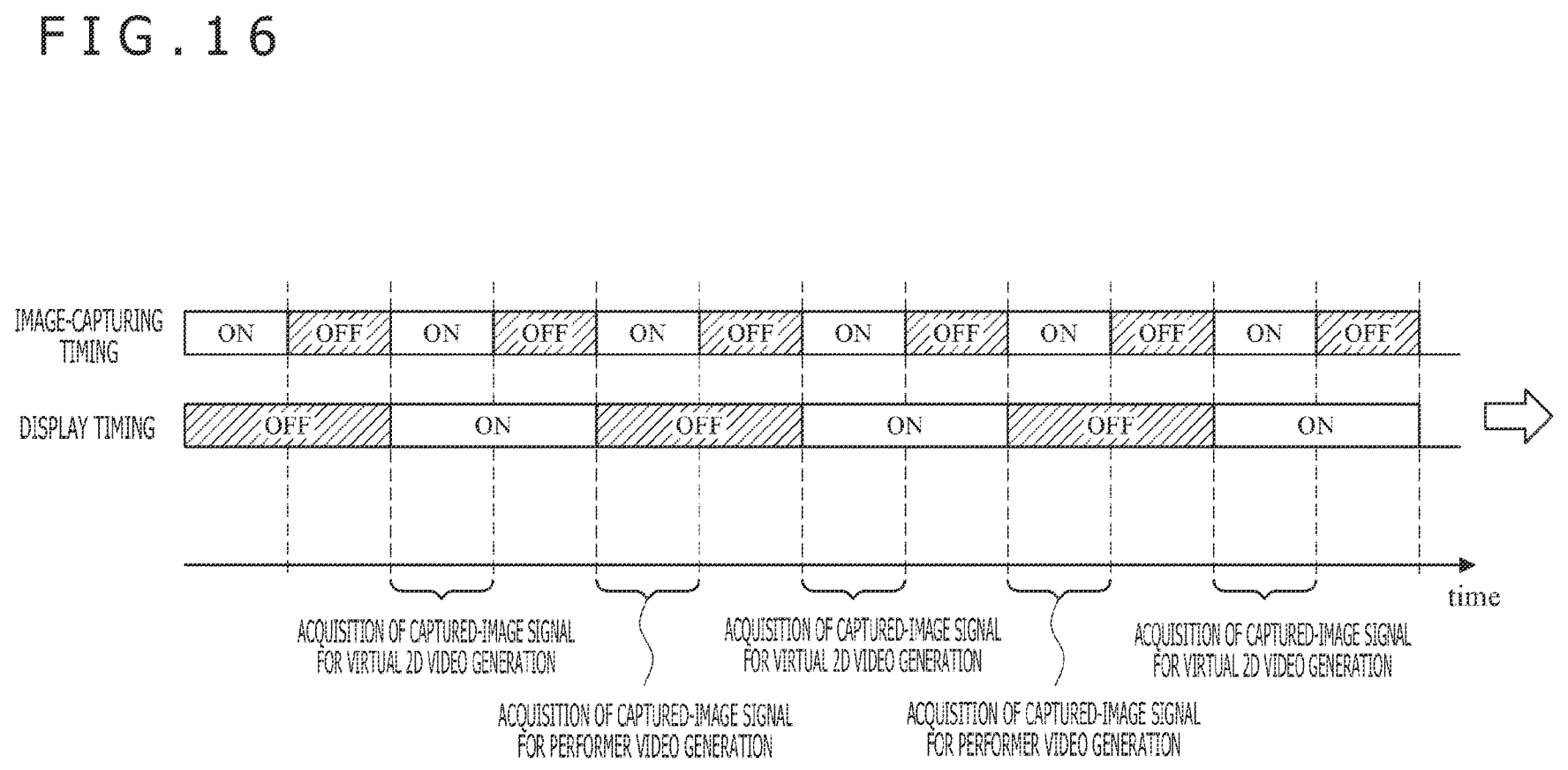

FIG. 16 is a diagram depicting an example of control of timings of display ON/OFF and image-capturing ON/OFF according to the first modification example. As depicted in FIG. 16, for example, the timing is controlled such that each period of time in the display timing is twice as long as each period of time in the image-capturing timing. That is, the timing control unit 24_a_ generates timing information to perform control to turn off displaying when image-capturing is turned on, control to turn on displaying when image-capturing is turned on, and control to turn on displaying when image-capturing is turned off, as depicted in FIG. 16. Accordingly, a captured image for generating a 3D model of a performer can be acquired at a timing when displaying is turned off, and further, a captured image for a virtual 2D video can be acquired at a timing when displaying of an audience video is turned on. In addition, a timing of image-capturing OFF is also provided at a timing when displaying of an audience video is turned on. Note that, in the present modification example, display timing information is also input from the timing control unit 24_a_ to the video acquiring unit 25, and the video acquiring unit 25 can refer to the display timing information when generating multi-viewpoint data, and acquire, as a captured image for a virtual 2D video, an image captured at a timing when displaying is also turned on.

Although, in the example depicted in FIG. 16, the length of each period of display ON is longer than the length of each period of image-capturing ON, it is desirable that each period of time in the image-capturing timing of a camera be made shorter and image-capturing be performed at a high rate such that the period of display ON satisfies a condition that the frequency has to be equal to or higher than the critical flicker frequency (approximately 30 to 40 Hz).
(Generation of Virtual 2D Video)

The virtual 2D video generating unit 280 acquires, from the video acquiring unit 25, multi-viewpoint data for a virtual 2D video obtained by integrating multiple captured images acquired at a timing when image-capturing is turned on and when displaying of an audience video is also turned on. Meanwhile, multiple captured images acquired at a timing when image-capturing is turned on but when displaying of an audience video is turned off are output from the video acquiring unit 25 to the performer information generating unit 26 as multi-viewpoint data for 3D model generation, similarly to the embodiment mentioned above.

The virtual 2D video generating unit 280 selects a 2D video (captured image) of a certain viewpoint from the multi-viewpoint data for a virtual 2D video. As the selection method, the 2D video may be selected by a staff (the director who is responsible for video production, etc.) on the distributor side while taking into consideration the position of the performer and the way the audience video appears, or may be selected automatically by using an image analysis technology. In addition, the virtual 2D video generating unit 280 performs processing to render the selected captured image such that it reflects stagecraft intentions. For example, conceivable examples include trimming (cropping), scaling, and the like. The virtual 2D video generating unit 280 outputs, to the transmitting unit 281, a video signal having been subjected to such processing, as a virtual 2D video. For example, the transmitting unit 281 performs an encoding process on the virtual 2D video by using a predetermined codec therein, and transmits the virtual 2D video encoded data to the virtual 2D video display system 4 via the network 43.

(Presentation of Virtual 2D Video)

Figure 17:
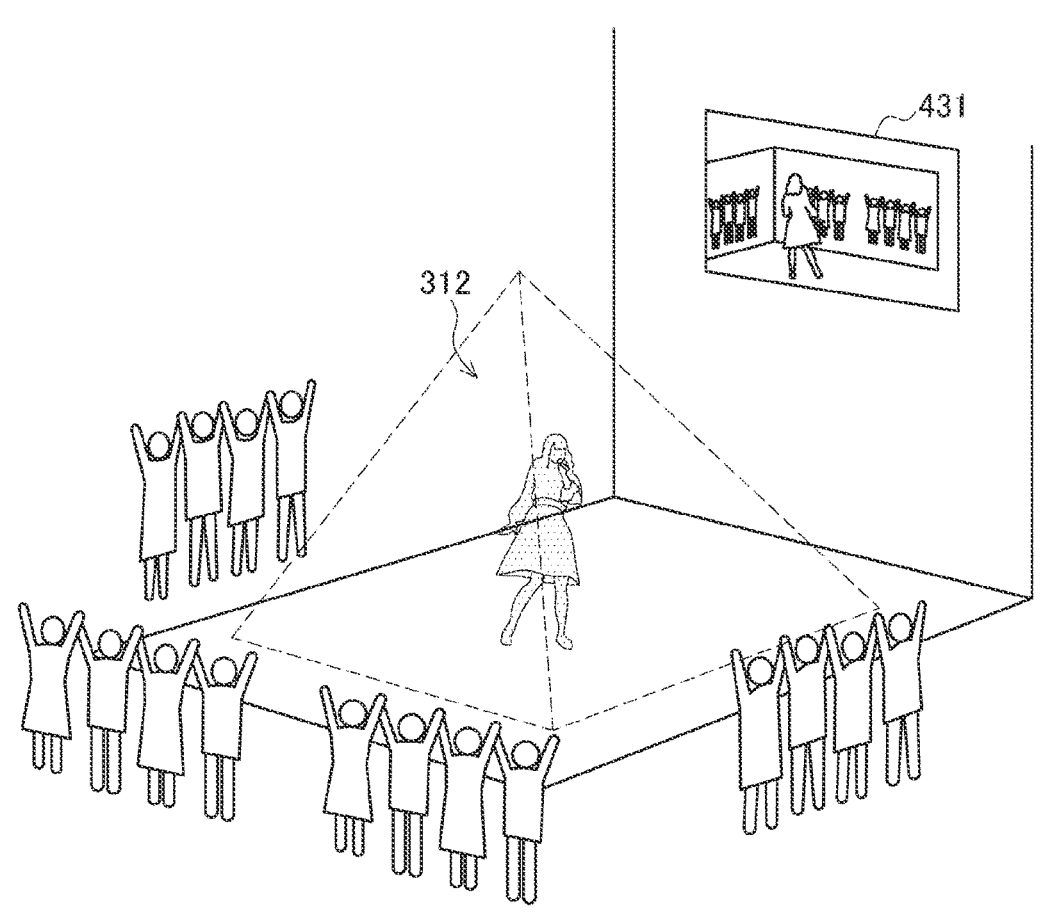
FIG. 17 is a diagram for explaining an example of presentation of a virtual 2D video at a concert venue according to the first modification example of the present embodiment.

As depicted in FIG. 15, the virtual 2D video display system 4 has a receiving unit 401, a display control unit 402, and a display unit 403. The receiving unit 401 decodes the virtual 2D video encoded data with a predetermined decoder, and outputs the virtual 2D video to the display control unit 402. For example, the display control unit 402 displays the virtual 2D video on a large screen 431 (an example of the display unit 403) at a concert venue as depicted in FIG. 17. The display control unit 402 displays the virtual 2D video for the audience at the concert venue. Note that, at the concert venue, the performer video display system 3 can separately display the 3D performer video (stereographic hologram) 312 on the stage.

Even when the audience is viewing and listening to the 3D performer video (stereographic hologram) 312, the audience can watch, on the large screen 431, as seen from a third person's viewpoint, a video of the performer who is watching an audience video and giving a performance. Since the audience can recognize that the performer is giving the performance for the audience, they can experience a remote concert with a higher sense of unity.

Note that the presentation location of the virtual 2D video and the type of the display unit 403 depicted in FIG. 17 are examples, and the present embodiment is not limited to them. For example, the display unit 403 may be a large-sized display.

In addition, whereas it is supposed in the present modification example that a virtual 2D video is generated by capturing together an image of the performer and an image of an audience video displayed in the display areas 233, what is captured together is not limited to an audience video. For example, a virtual 2D video may be generated by capturing together an image of the performer and an image of a CG video (a video for stagecraft effects) that changes depending on music. In addition, it is also possible to use the generated virtual 2D video as a recorded concert video in the future.

4-2. Second Modification Example

In a second modification example, a function of rendering a performer video or the like such that it reflects illumination effects is added. FIG. 18 is a diagram depicting a configuration example of the information processing systems according to the second modification example. The system depicted in FIG. 18 additionally includes an illuminating device 29, a virtual 2D-video illumination-effect rendering unit 290, and a performer-video illumination-effect rendering unit 291 in the system depicted in FIG. 15. The illuminating device 29 is used for stagecraft, and one or more illuminating devices 29 are disposed in a studio. The positions of the illuminating devices 29 are not particularly limited.

(Illumination Timing Control)

A timing control unit 24b according to the second modification example generates timing information including control to shift (make different) the timing of display ON and the timing of image-capturing ON, timing information including control to synchronize (make the same) the timing of display ON and the timing of image-capturing ON, and also timing information including control to synchronize (make the same) the timing of image-capturing ON and a timing of illumination ON, and outputs the timing information to the display processing unit 23, the video acquiring unit 25, and the illuminating device 29.

FIG. 19 is a diagram depicting an example of control of timings of display ON/OFF, image-capturing ON/OFF, and illumination ON/OFF according to the second modification example. The timing control unit 24b generates timing information to perform control to turn off displaying and illumination when image-capturing is turned on, control to turn on displaying but turn off illumination when image-capturing is turned on, and control to turn off displaying but turn on illumination when image-capturing is turned on, as depicted in FIG. 19.

Accordingly, a captured image for 3D model generation can be acquired at a timing when displaying and illumination are turned off, a captured image for a virtual 2D video can be acquired at a timing when displaying of an audience video is turned on but illumination is turned off, and further, a captured image for illumination effects can be acquired at a timing when displaying of an audience video is turned off but illumination is turned on.

In the example depicted in FIG. 19, the length of each period of display OFF is equal to the length of two repeated periods of image-capturing ON/OFF, and the length of each period of display ON is equal to the length of one period of image-capturing ON/OFF. In this case also, it is desirable that each period of time in the image-capturing timing of a camera be made shorter and image-capturing be performed at a high rate such that the period of display ON satisfies a condition that the frequency has to be equal to or higher than the critical flicker frequency (approximately 30 to 40 Hz).

Note that the timing control depicted in FIG. 19 is an example, and the timing control unit 24b may generate any timing information as long as it is timing information for generating at least the three combinations of ON/OFF control described above.

(Generation of Multi-Viewpoint Data)

The video acquiring unit 25 combines multiple captured images acquired with the multiple image-capturing sections 251, and generates multi-viewpoint data. In addition, in the present modification example, display timing information and illumination timing information are also input from the timing control unit 24b to the video acquiring unit 25, and the video acquiring unit 25 can refer to the display timing information and the illumination timing information when generating multi-viewpoint data, acquire, as multi-viewpoint data for a virtual 2D video, images captured at a timing when displaying is also turned on, and acquire, as multi-viewpoint data for illumination effects, images captured at a timing when illumination is also turned on. In addition, captured images acquired at a timing when both displaying and illumination are turned off can be acquired as multi-viewpoint data for 3D model generation (multi-viewpoint data for a performer video).

(Illumination Effect Rendering)

The virtual 2D-video illumination-effect rendering unit 290 performs an alignment process such as motion compensation on the multi-viewpoint data for illumination effects on the basis of the multi-viewpoint data for a virtual 2D video and the multi-viewpoint data for illumination effects that are output from the video acquiring unit 25, and performs a process of rendering the multi-viewpoint data for a virtual 2D video such that it reflects the multi-viewpoint data for illumination effects. The virtual 2D-video illumination-effect rendering unit 290 outputs the rendered multi-viewpoint data for a virtual 2D video to the virtual 2D video generating unit 280.

In addition, the performer-video illumination-effect rendering unit 291 performs an alignment process such as motion compensation on the multi-viewpoint data for illumination effects on the basis of the multi-viewpoint data for 3D model generation and multi-viewpoint data for illumination effects that are output from the video acquiring unit 25, and performs a process of rendering the multi-viewpoint data for 3D model generation such that it reflects the multi-viewpoint data for illumination effects. The performer-video illumination-effect rendering unit 291 outputs the rendered multi-viewpoint data for 3D model generation to the performer information generating unit 26.

Both the virtual 2D-video illumination-effect rendering unit 290 and the performer-video illumination-effect rendering unit 291 perform a frame interpolation process and a process of generating an illumination-effect-reflecting texture.

Figure 20:
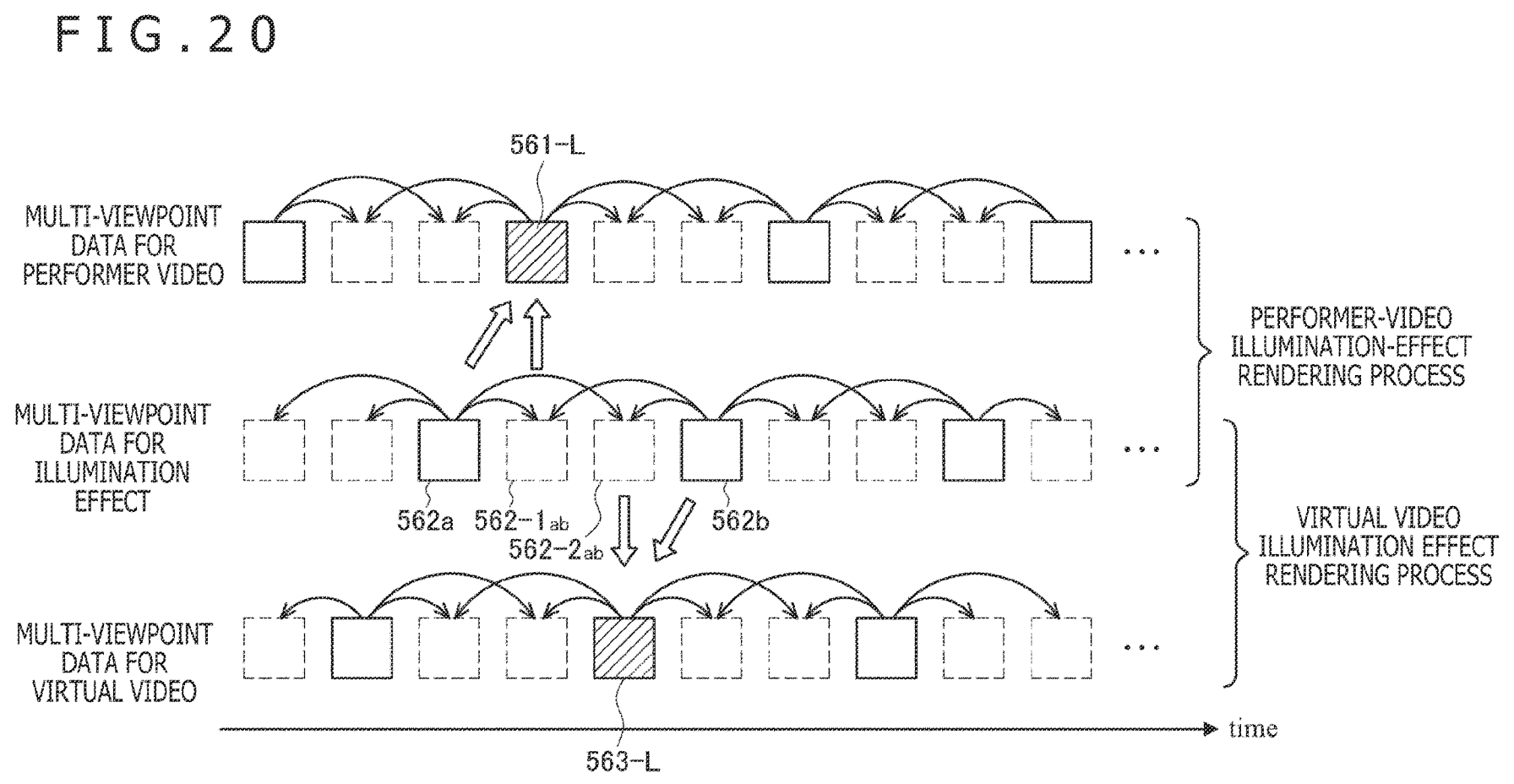

FIG. 20 is a diagram for explaining a virtual 2D-video illumination-effect rendering process and a performer-video illumination-effect rendering process according to the second modification example. For example, the performer-video illumination-effect rendering unit 291 performs a frame interpolation process and generation of an illumination-effect-reflecting texture on data depicted in the upper two rows in FIG. 20 (multi-viewpoint data for a performer video and multi-viewpoint data for illumination effects).

Specifically, first, frames at time points represented by dotted lines in the multi-viewpoint data for a performer video and multi-viewpoint data for illumination effects depicted in FIG. 20 are generated by interpolation with the use of data of the past and future existing frames. For example, a frame $562\text{-}1_{ab}$ is generated from an existing past frame 562$a$ and an existing future frame 562$b$. In addition, a frame $562\text{-}2_{ab}$ is generated from the existing past frame 562$a$ and the existing future frame 562$b$. The frame interpolation process may use a technology for automatically generating intermediate frames by prediction using machine learning, for example.

Next, the performer-video illumination-effect rendering unit 291 renders frames of the multi-viewpoint data for a performer video (multi-viewpoint data for 3D model generation) such that they reflect illumination effects from frames of the multi-viewpoint data for illumination effects. The performer-video illumination-effect rendering unit 291 uses, as reference data, at least one of a frame (e.g., the frame $562\text{-}1_{ab}$) of the multi-viewpoint data for illumination effects that is temporally corresponding to a frame (e.g., a frame 561-L represented by diagonal lines) at a certain time in target multi-viewpoint data for a performer video; and the temporally-closest existing frame (e.g., the frame 562$a$) in the multi-viewpoint data for illumination effects. Specifically, the performer-video illumination-effect rendering unit 291 searches the reference data for data similar to the frame 561-L of multi-viewpoint data for a live-action video, and replaces the frame 561-L with the data as data reflecting stagecraft illumination effects. This process is what is called a template matching technique, and is performed for each local region typically. In addition, deformation is performed at a time of the replacement in some cases, and various geometric transformation processes such as affine transformation can be applied. Further, as the cost function used at a time of a search, various indices representing the similarity of images (Sum of Absolute Difference (SAD), Sum of Squared Difference (SSD), Normalized Cross-Correlation (NCC), and Zero-means Normalized Cross-Correlation (ZNCC)) can be used.

Meanwhile, similarly to the manner described above, the virtual 2D-video illumination-effect rendering unit 290 performs a frame interpolation process and generation of an illumination-effect-reflecting texture on data depicted in the lower two rows in FIG. 20 (multi-viewpoint data for illumination effects and multi-viewpoint data for a virtual 2D video).

With the processes mentioned above, it is possible to generate a texture reflecting illumination effects regarding reflection, luster of skin, shine of skin, or the like, and to render a performer video or a virtual 2D video such that it reflects the illumination effects. Accordingly, it is possible to provide a video reflecting stagecraft illumination effects which are close to those in an actual concert, to an audience.

5. Hardware Configuration Example

Next, a hardware configuration example of an information processing apparatus according to the embodiment of the present disclosure is explained with reference to FIG. 21. The processes performed by the audience information output system 1, the performer information input/output system 2, and the performer video display system 3 mentioned above can be performed by one or more information processing apparatuses. FIG. 21 is a block diagram depicting a hardware configuration example of an information processing apparatus 900 that implements the audience information output system 1, the performer information input/output system 2, or the performer video display system 3 according to the embodiment of the present disclosure. Note that the information processing apparatus 900 need not necessarily have the entire hardware configuration depicted in FIG. 21. In addition, a part of the hardware configuration depicted in FIG. 21 may not be present in the audience information output system 1, the performer information input/output system 2, or the performer video display system 3.

As depicted in FIG. 21, the information processing apparatus 900 includes a CPU (Central Processing unit) 901, a ROM (Read Only Memory) 903, and a RAM (Random Access Memory) 905. In addition, the information processing apparatus 900 may include a host bus 907, a bridge 909, an external bus 911, an interface 913, an input device 915, an output device 917, a storage device 919, a drive 921, a connection port 923, and a communication device 925. The information processing apparatus 900 may have a processing circuit like one called a GPU (Graphics Processing Unit), a DSP (Digital Signal Processor), or an ASIC (Application Specific Integrated Circuit), instead of or along with the CPU 901.

The CPU 901 functions as a calculation processing device and a control device, and controls the whole or a part of operation in the information processing apparatus 900 according to various programs recorded on the ROM 903, the RAM 905, the storage device 919, or a removable recording medium 927. The ROM 903 stores programs, calculation parameters, and the like to be used by the CPU 901. The RAM 905 temporarily stores programs to be used in execution by the CPU 901, parameters that appropriately change during the execution, or the like. The CPU 901, the ROM 903, and the RAM 905 are interconnected by the host bus 907 including an internal bus such as a CPU bus. Further, the host bus 907 is connected to the external bus 911 such as a PCI (Peripheral Component Interconnect/Interface) bus via the bridge 909.

For example, the input device 915 is a device such as a button to be manipulated by a user. The input device 915 may include a mouse, a keyboard, a touch panel, a switch, a lever, and the like. In addition, the input device 915 may include a microphone that detects sounds of a user. For example, the input device 915 may be a remote control device using infrared rays or other radio waves or may be externally connected equipment 929 such as a mobile phone that supports manipulation of the information processing apparatus 900. The input device 915 includes an input control circuit that generates an input signal on the basis of information input by a user and that outputs the input signal to the CPU 901. The user inputs various types of data or gives an instruction on a process operation to the information processing apparatus 900 by manipulating the input device 915.

In addition, the input device 915 may include an image-capturing device and sensors. For example, the image-capturing device is a device that captures images of a real space by using image-capturing elements such as a CCD (Charge Coupled Device) or a CMOS (Complementary Metal Oxide Semiconductor) and various members such as lenses for controlling formation of an image of a subject onto the image-capturing elements, and that generates captured images. The image-capturing device may be one that captures still images or may be one that captures videos.

For example, the sensors are various sensors such as a distance measurement sensor, an acceleration sensor, a gyro sensor, a geomagnetic sensor, a vibration sensor, an optical sensor, or a sound sensor. For example, the sensors acquire information regarding the state of the information processing apparatus 900 itself such as the posture of the housing of the information processing apparatus 900, and information regarding the surrounding environment of the information processing apparatus 900 such as the brightness and noises around the information processing apparatus 900. In addition, the sensors may include a GPS (Global Positioning System) sensor that receives GPS signals and that measures the latitude, longitude, and altitude of the apparatus.

The output device 917 includes a device that can visually or auditorily notify acquired information to a user. For example, the output device 917 can be a display device such as an LCD (Liquid Crystal Display) or an organic EL (Electro-Luminescence) display, a sound output device such as a speaker or headphones, and the like. In addition, the output device 917 may include a PDP (Plasma Display Panel), a projector, a hologram, a printer device, and the like. The output device 917 outputs results obtained by processes performed by the information processing apparatus 900, as videos of text, images, or the like, as auditory information such as sounds or acoustic information, and so on. In addition, the output device 917 may include an illuminating device or the like that makes the surrounding space bright.

The storage device 919 is a device for data storage configured as an example of a storage section of the information processing apparatus 900. For example, the storage device 919 includes a magnetic storage device, a semiconductor storage device, an optical storage device, a magneto-optical storage device, or the like such as an HDD (Hard Disk Drive). This storage device 919 stores programs to be executed by the CPU 901, various types of data, various types of data acquired from the outside, and the like.

The drive 921 is a reader/writer for the removable recording medium 927 such as a magnetic disc, an optical disc, a magneto-optical disc, or a semiconductor memory, and is built in or externally attached to the information processing apparatus 900. The drive 921 reads out information recorded on the attached removable recording medium 927, and outputs the information to the RAM 905. In addition, the drive 921 writes records on the attached removable recording medium 927.

The connection port 923 is a port for directly connecting equipment to the information processing apparatus 900. For example, the connection port 923 can be a USB (Universal Serial Bus) port, an IEEE 1394 port, an SCSI (Small Computer System Interface) port, or the like. In addition, the connection port 923 may be an RS-232C port, an optical audio terminal, an HDMI (registered trademark) (High-Definition Multimedia Interface) port, or the like. By connecting the externally connected equipment 929 to the connection port 923, various types of data can be exchanged between the information processing apparatus 900 and the externally connected equipment 929.

For example, the communication device 925 is a communication interface including a communication device or the like for connection to a network 931. For example, the communication device 925 can be a communication card or the like for a cable or wireless LAN (Local Area Network), Bluetooth (registered trademark), Wi-Fi (registered trademark), or a WUSB (Wireless USB). In addition, the communication device 925 may be a router for optical communication, a router for ADSL (Asymmetric Digital Subscriber Line), a modem for various types of communication, or the like. For example, the communication device 925 transmits and receives signals and the like to and from the Internet and other communication equipment by using a predetermined protocol such as TCP/IP. In addition, the network 931 connected to the communication device 925 is a network connected through a cable or wirelessly, and is the Internet, a home LAN, infrared communication, radio wave communication, satellite communication, or the like, for example.

6. Supplementary Notes

Whereas the preferred embodiment of the present disclosure has been explained in detail with reference to the attached drawings thus far, the present technology is not limited to the example. Obviously, it is possible for those with ordinary knowledge in the technical field of the present disclosure to conceive of various modification examples or corrected examples within the scope of the technical idea described in claims, and those various modification examples or corrected examples are understood as belonging to the technical scope of the present disclosure certainly.

For example, conceivable audience examples also include an audience viewing and listening to a performance (concert, etc.) of a performer by using AR (Augmented Reality) or MR (Mixed Reality).

In addition, whereas it has been explained that the timing control unit 24 outputs image-capturing timing information and display timing information, the present disclosure is not limited to this. For example, it is also possible to cause the display processing unit 23 to perform display ON/OFF control at predetermined timings, and also to give the video acquiring unit 25 an instruction to perform image-capturing ON/OFF control at corresponding predetermined timings. In addition, for example, on the contrary, it is also possible to cause the video acquiring unit 25 to perform image-capturing ON/OFF control at predetermined timings, and also to give the display processing unit 23 an instruction to perform display ON/OFF control at corresponding predetermined timings.

In addition, whereas displaying is turned off at the timing of image-capturing ON when captured images for generating a 3D model are acquired, control (display ON control) to display solid green or solid blue images to be used as green screens or blue screens may be performed.

In addition, whereas the system having the function of generating a virtual 2D video depicted in the first modification example additionally has the illumination effect rendering function in an example explained as the second modification example, the present disclosure is not limited to this, and only the illumination effect rendering function depicted in the second modification example may be added to the system explained with reference to FIG. 1.

In addition, it is also possible to create one or more computer programs for causing hardware, such as the CPU, the ROM, or the RAM built in the information processing apparatus 900 mentioned above, to perform the functions of the audience information output system 1, the performer information input/output system 2, or the performer video display system 3. In addition, a computer-readable storage medium having stored thereon the one or more computer programs is also provided.

In addition, the advantages described in the present specification are presented merely for explanation or illustration, but not for limitation. That is, the technology according to the present disclosure can exhibit other advantages that are obvious for those skilled in the art from the description of the present specification, along with the advantages described above or instead of the advantages described above.

Note that the present technology can also take the following configurations.

(1)

An information processing apparatus including:

a control section that performs control of image-capturing with multiple image-capturing sections for acquiring three-dimensional information regarding a subject and display control to display an image acquired from an outside in one or more display regions positioned around the subject, in which the control section performs control such that a timing when the image-capturing is performed and a timing when the image acquired from the outside is displayed in the display regions are made different from each other.

(2)

The information processing apparatus according to (1) above, in which the image acquired from the outside is a captured audience video of an audience viewing and listening to a two-dimensional or three-dimensional performer video generated on the basis of the three-dimensional information regarding a performer who is the subject.

(3)

The information processing apparatus according to (1) above, in which the image acquired from the outside is a virtual space video including, in a field of view thereof, an audience avatar viewing and listening to, in a virtual space, a two-dimensional or three-dimensional performer video generated on the basis of the three-dimensional information regarding a performer who is the subject.

(4)

The information processing apparatus according to (2) or (3) above, in which the control section extracts a region of the performer from multiple captured images that are simultaneously captured with the multiple image-capturing sections positioned around the subject, generates a three-dimensional model of the performer, and generates the performer video of a free viewpoint from the three-dimensional model.

(5)

The information processing apparatus according to any one of (2) to (4) above, in which the control section performs control to select a particular audience member or a particular audience avatar according to an instruction from the performer, and display, in the display regions, an audience video of the selected audience member or audience avatar as the image acquired from the outside.

(6)

The information processing apparatus according to any one of (1) to (5) above, in which the control section generates display timing information for giving an instruction to perform control not to display the image at the timing when the image-capturing is performed, and perform control to display the image at a timing when the image-capturing is not performed.

(7)

The information processing apparatus according to any one of (1) to (6) above, in which the control section generates image-capturing timing information for giving an instruction to perform control not to perform the image-capturing at the timing when the image is displayed, and perform control to perform the image-capturing at a timing when the image is not displayed.

(8)

The information processing apparatus according to any one of (1) to (7) above, in which the control section executes the display control of the image acquired from the outside, at a display rate satisfying at least a critical flicker frequency.

(9)

The information processing apparatus according to any one of (1) to (8) above, in which the control section performs control such that the timing when the image-capturing is performed and the timing when the image acquired from the outside is displayed in the display regions are made the same, as well as the control such that these timings are made different from each other.

(10)

The information processing apparatus according to (9) above, in which the control section performs control to transmit, to an audience side, an image of a performer who is the subject, the image of the performer being acquired by performing the image-capturing at the timing when the image is displayed and including, on a background, the image displayed in the display regions.

(11)

The information processing apparatus according to any one of (1) to (10) above, in which the control section executes first image-capturing control to perform the image-capturing at a timing when the image is not displayed and when illumination of the subject is not performed, and second image-capturing control to perform the image-capturing at a timing when the image is not displayed but when the illumination of the subject is performed.

(12)

An information processing method performed by a processor, the information processing method including:

performing control of image-capturing with multiple image-capturing sections for acquiring three-dimensional information regarding a subject and display control to display an image acquired from an outside in one or more display regions positioned around the subject; and performing control such that a timing when the image-capturing is performed and a timing when the image acquired from the outside is displayed in the display regions are made different from each other.

(13)

A system including:

multiple image-capturing devices that are arranged around a subject in order to acquire three-dimensional information regarding the subject;

one or more display regions arranged around the subject; and an information processing apparatus including a control section that performs control of image-capturing with the multiple image-capturing devices and display control to display an image acquired from an outside in the one or more display regions, in which the control section performs control such that a timing when the image-capturing is performed and a timing when the image acquired from the outside is displayed in the display regions are made different from each other.

REFERENCE SIGNS LIST

1: Audience information output system
2: Performer information input/output system
21: Receiving unit
22: Distribution display data generating unit
23: Display processing unit
24: Timing control unit
25: Video acquiring unit
26: Performer information generating unit
27: Transmitting unit
3: Performer video display system
900: Information processing apparatus

The invention claimed is:

1. An information processing apparatus comprising:
circuitry configured to
  perform control of image-capturing with multiple image-capturing sections for acquiring three-dimensional information regarding a subject, and
  execute display control to display an image acquired from an outside in one or more display regions positioned around the subject,
wherein the circuitry performs control such that a timing when the image-capturing is performed and a timing when the image acquired from the outside is displayed in the one or more display regions are made different from each other, and
wherein the image acquired from the outside includes a captured audience video of an audience viewing and listening to a two-dimensional or three-dimensional performer video generated based on the three-dimensional information regarding a performer who is the subject.

2. The information processing apparatus according to claim 1,
wherein the image acquired from the outside further includes a virtual space video including, in a field of view thereof, an audience avatar viewing and listening to, in a virtual space, the two-dimensional or three-dimensional performer video generated based on the three-dimensional information regarding the performer who is the subject.

3. The information processing apparatus according to claim 1,
wherein the circuitry is further configured to
  extract a region of the performer from multiple captured images that are simultaneously captured with the multiple image-capturing sections positioned around the subject,
  generate a three-dimensional model of the performer, and
  generate the performer video of a free viewpoint from the three-dimensional model.

4. The information processing apparatus according to claim 1,
wherein the circuitry is further configured to
  perform control to select a particular audience member or a particular audience avatar according to an instruction from the performer, and
  perform control to display, in the one or more display regions, an audience video of the selected audience member or audience avatar as the image acquired from the outside.

5. The information processing apparatus according to claim 1,
wherein the circuitry is further configured to generate display timing information for giving an instruction to
  perform control not to display the image at the timing when the image-capturing is performed, and
  perform control to display the image at a timing when the image-capturing is not performed.

6. The information processing apparatus according to claim 1,
wherein the circuitry is further configured to generate image-capturing timing information for giving an instruction to
  perform control not to perform the image-capturing at the timing when the image is displayed, and
  perform control to perform the image-capturing at a timing when the image is not displayed.

7. The information processing apparatus according to claim 1,
wherein the circuitry executes the display control of the image acquired from the outside, at a display rate satisfying at least a critical flicker frequency.

8. The information processing apparatus according to claim 1,
wherein the circuitry performs control such that the timing when the image-capturing is performed and the timing when the image acquired from the outside is displayed in the one or more display regions are made same, as well as the control such that these timings are made different from each other.

9. The information processing apparatus according to claim 8,
wherein the circuitry is further configured to perform control to transmit, to an audience side, an image of a performer who is the subject, the image of the performer being acquired by performing the image-capturing at the timing when the image is displayed and including, on a background, the image displayed in the one or more display regions.

10. The information processing apparatus according to claim 1, wherein the circuitry is further configured to execute first image-capturing control to perform the image-capturing at a timing when the image is not displayed and when illumination of the subject is not performed, and second image-capturing control to perform the image-capturing at a timing when the image is not displayed but when the illumination of the subject is performed.

11. The information processing apparatus according to claim 1, wherein the image acquired from the outside indicates an audience interaction with respect to the two-dimensional or three-dimensional performer video.

12. An information processing method performed by a processor, the information processing method comprising:

performing control of image-capturing with multiple image-capturing sections for acquiring three-dimensional information regarding a subject;

executing display control to display an image acquired from an outside in one or more display regions positioned around the subject; and performing control such that a timing when the image-capturing is performed and a timing when the image acquired from the outside is displayed in the one or more display regions are made different from each other, wherein the image acquired from the outside includes a captured audience video of an audience viewing and listening to a two-dimensional or three-dimensional performer video generated based on the three-dimensional information regarding a performer who is the subject.

13. A system comprising:

multiple image-capturing devices that are arranged around a subject in order to acquire three-dimensional information regarding the subject;

one or more display regions arranged around the subject; and an information processing apparatus including circuitry configured to perform control of image-capturing with the multiple image-capturing devices, and execute display control to display an image acquired from an outside in the one or more display regions, wherein the circuitry performs control such that a timing when the image-capturing is performed and a timing when the image acquired from the outside is displayed in the one or more display regions are made different from each other, and wherein the image acquired from the outside includes a captured audience video of an audience viewing and listening to a two-dimensional or three-dimensional performer video generated based on the three-dimensional information regarding a performer who is the subject.

* * * * *